United States Patent [19]

Slawson

[11] *4,096,563
[45] Jun. 20, 1978

[54] MACHINE TOOL CONTROL SYSTEM AND METHOD

[75] Inventor: Kenneth Leonard Slawson, Clarence, N.Y.

[73] Assignee: Houdaille Industries, Inc., Buffalo, N.Y.

[*] Notice: The portion of the term of this patent subsequent of Jan. 11, 1989, has been disclaimed.

[21] Appl. No.: 600,185

[22] Filed: Jul. 29, 1975

Related U.S. Application Data

[60] Continuation of Ser. No. 421,103, Dec. 3, 1973, and Ser. No. 426,602, Dec. 20, 1973, abandoned, which is a division of Ser. No. 150,637, Jun. 7, 1971, Pat. No. 3,816,723, which is a continuation of Ser. No. 744,392, Jul. 12, 1968, Pat. No. 3,634,662, which is a continuation-in-part of Ser. No. 652,968, Jul. 12, 1967, abandoned.

[51] Int. Cl.² .................. G06F 15/46; B23Q 21/00
[52] U.S. Cl. .................................... 364/107; 318/568; 318/570; 318/601
[58] Field of Search .............. 235/151.11; 444/1; 340/172.5; 318/569, 570, 568, 572, 573, 574, 601; 364/107

[56] References Cited

U.S. PATENT DOCUMENTS

| 3,079,522 | 2/1963 | McGarrel | 235/151.11 |
|---|---|---|---|
| 3,189,805 | 6/1965 | Poepsel et al. | 235/151.11 |
| 3,465,298 | 9/1969 | La Duke | 235/151.11 |
| 3,482,155 | 12/1969 | Fredriksen | 318/561 |
| 3,518,513 | 6/1970 | Pomella et al. | 235/151.11 |
| 3,546,559 | 12/1970 | Kosem | 318/594 |
| 3,555,254 | 1/1971 | Gerber | 235/151.11 |
| 3,559,021 | 1/1971 | Buigham, Jr. | 235/151.11 |

FOREIGN PATENT DOCUMENTS

| 786,486 | 5/1968 | Canada. |
|---|---|---|
| 15,635 | 9/1966 | Japan. |

OTHER PUBLICATIONS

UMAC-5: Operating Instructions, Sperry Gyroscope Company of Canada Ltd. Aug. 1964.
Dyke: Numerical Control (Textbook) Prentice Hall Inc. 1967 pp. 111.
Olesten: Numerical Control (Textbook) Wiley and Sons (Interscience) 1970 pp. 329-332.

Primary Examiner—Felix D. Gruber
Attorney, Agent, or Firm—Hill, Gross, Simpson, Van Santen, Steadman, Chiara & Simpson

[57] ABSTRACT

A control system having a stored program digital computer for transmitting commands to digital servos for one or a plurality of punch presses; for changing new commands to correct for preceding servo errors and/or mechanical tolerance errors in the servos; for monitoring machine tool and servo condition and supervising punching, tool change and positioning operations; and having provision for assisting in the generation of coded record command tapes on the basis of incremental and-/or absolute dimensional input, on a time sharing basis with automatic operation of the servos from a previously generated record tape.

61 Claims, 13 Drawing Figures

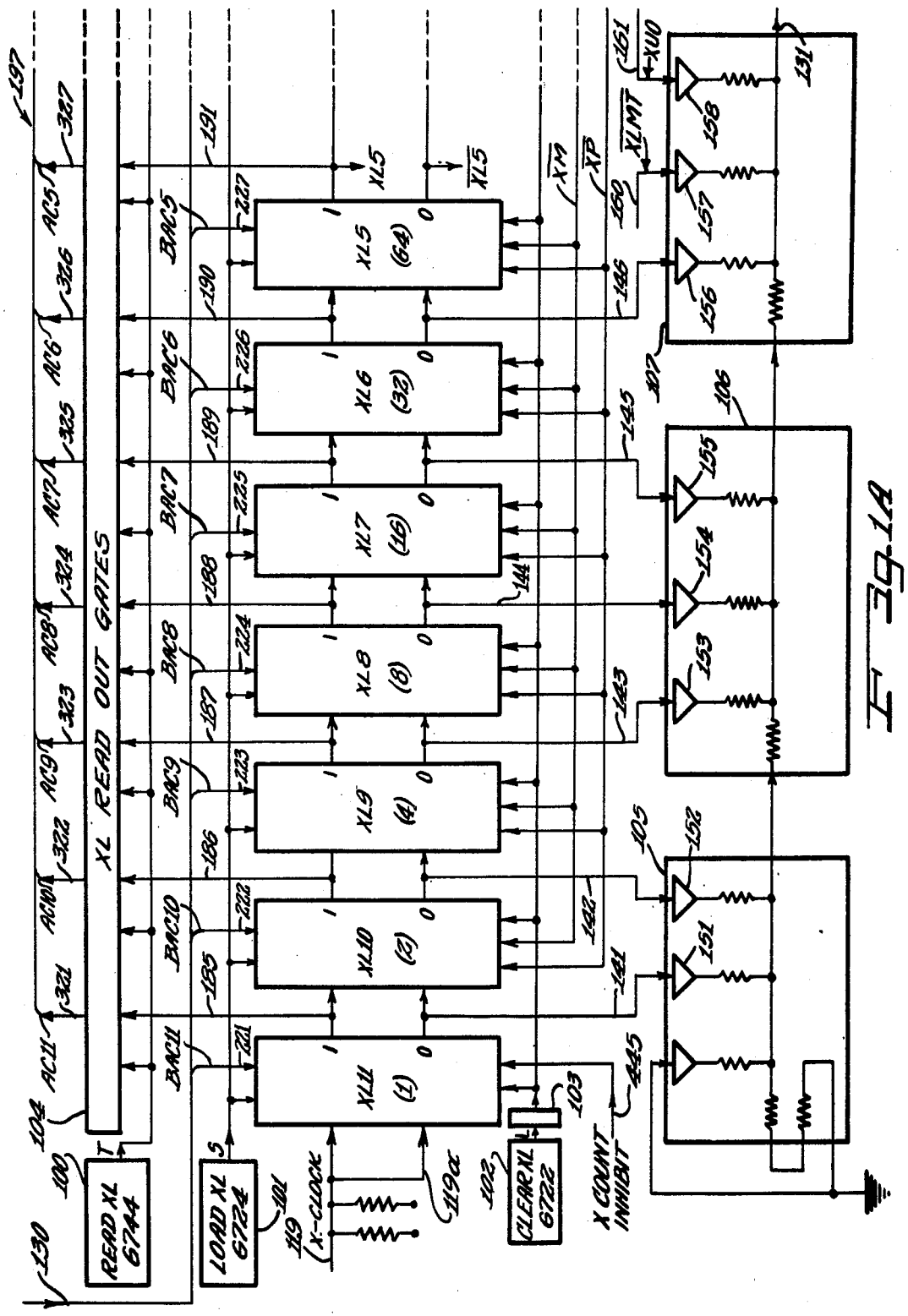

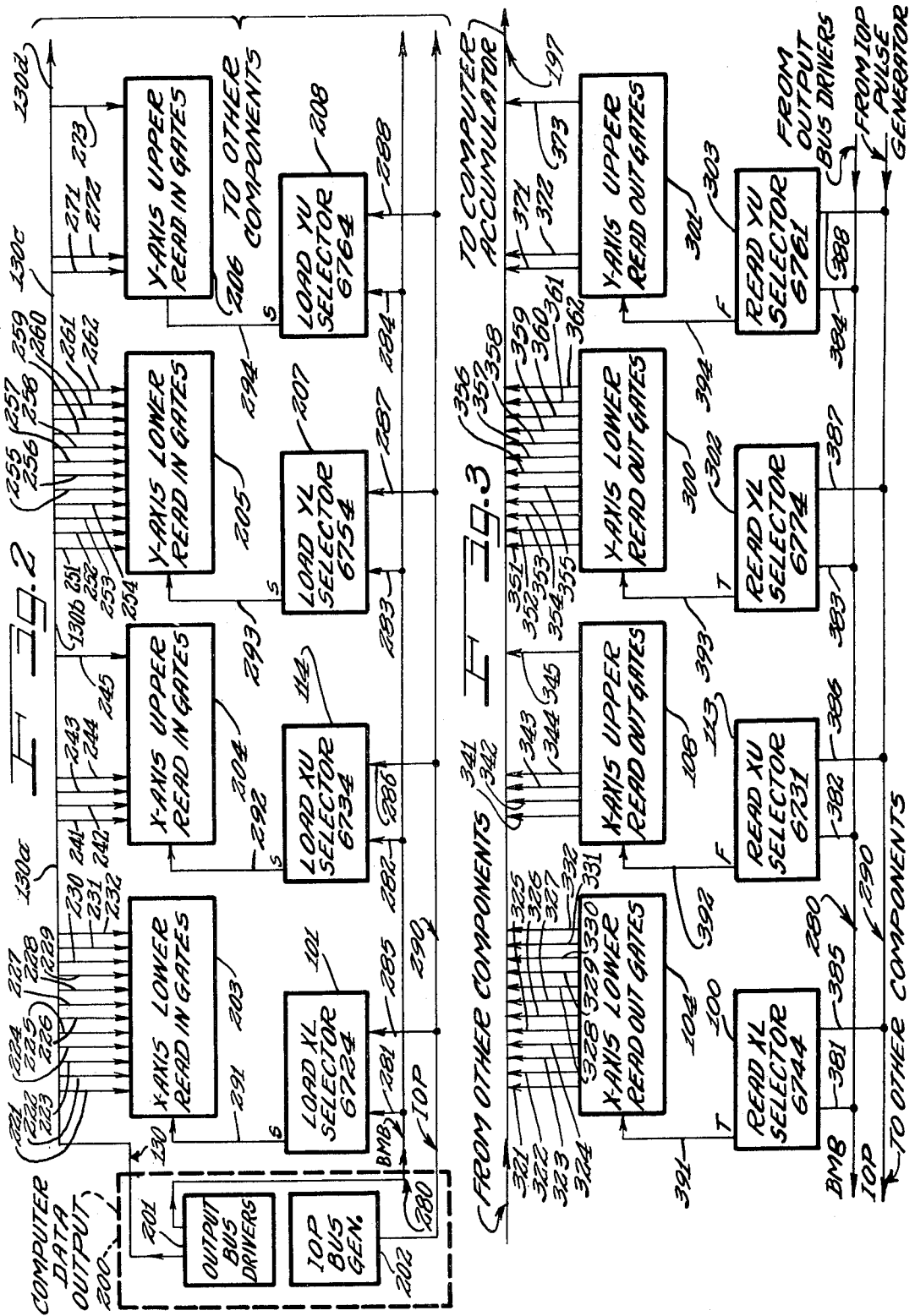

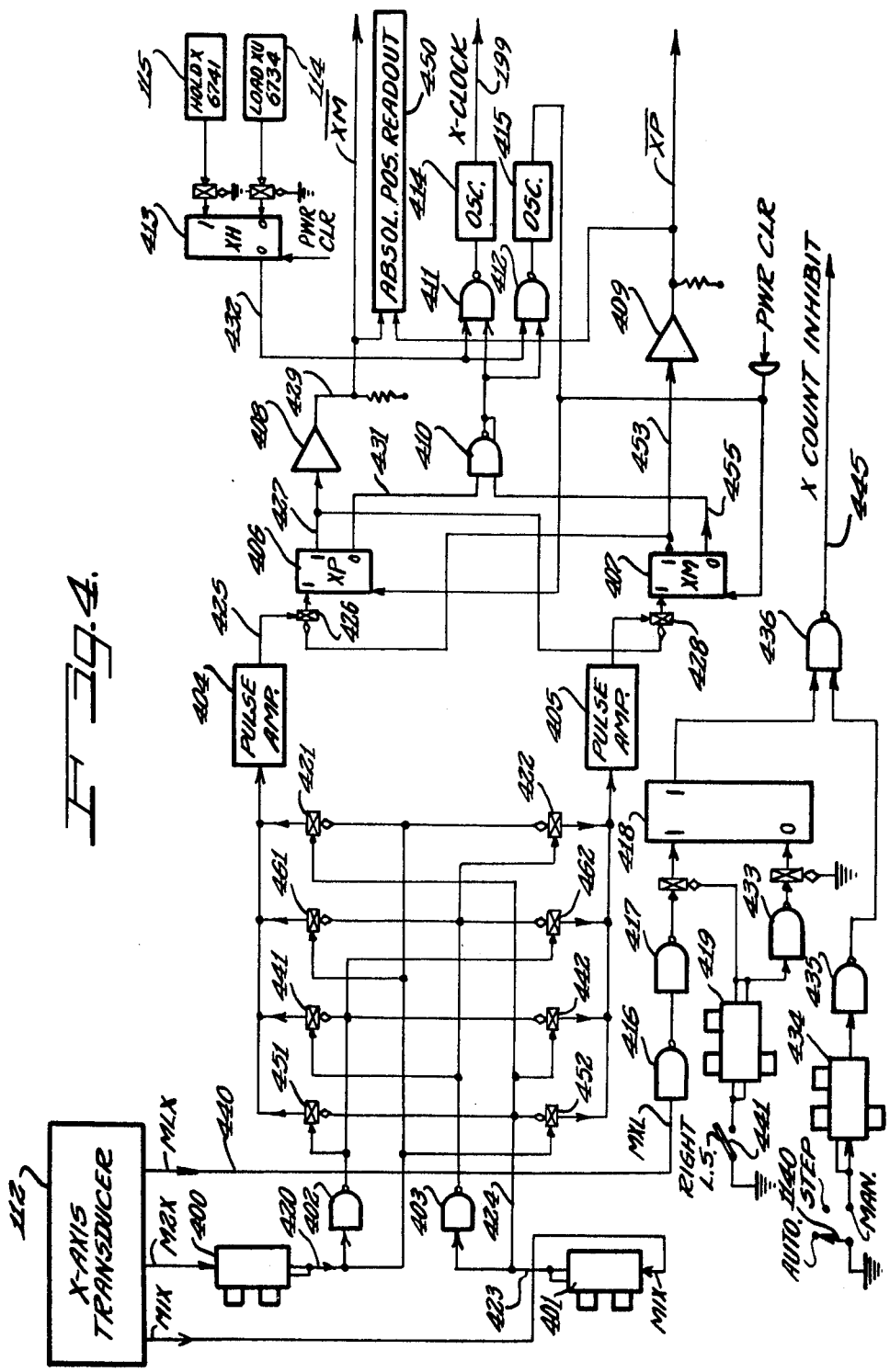

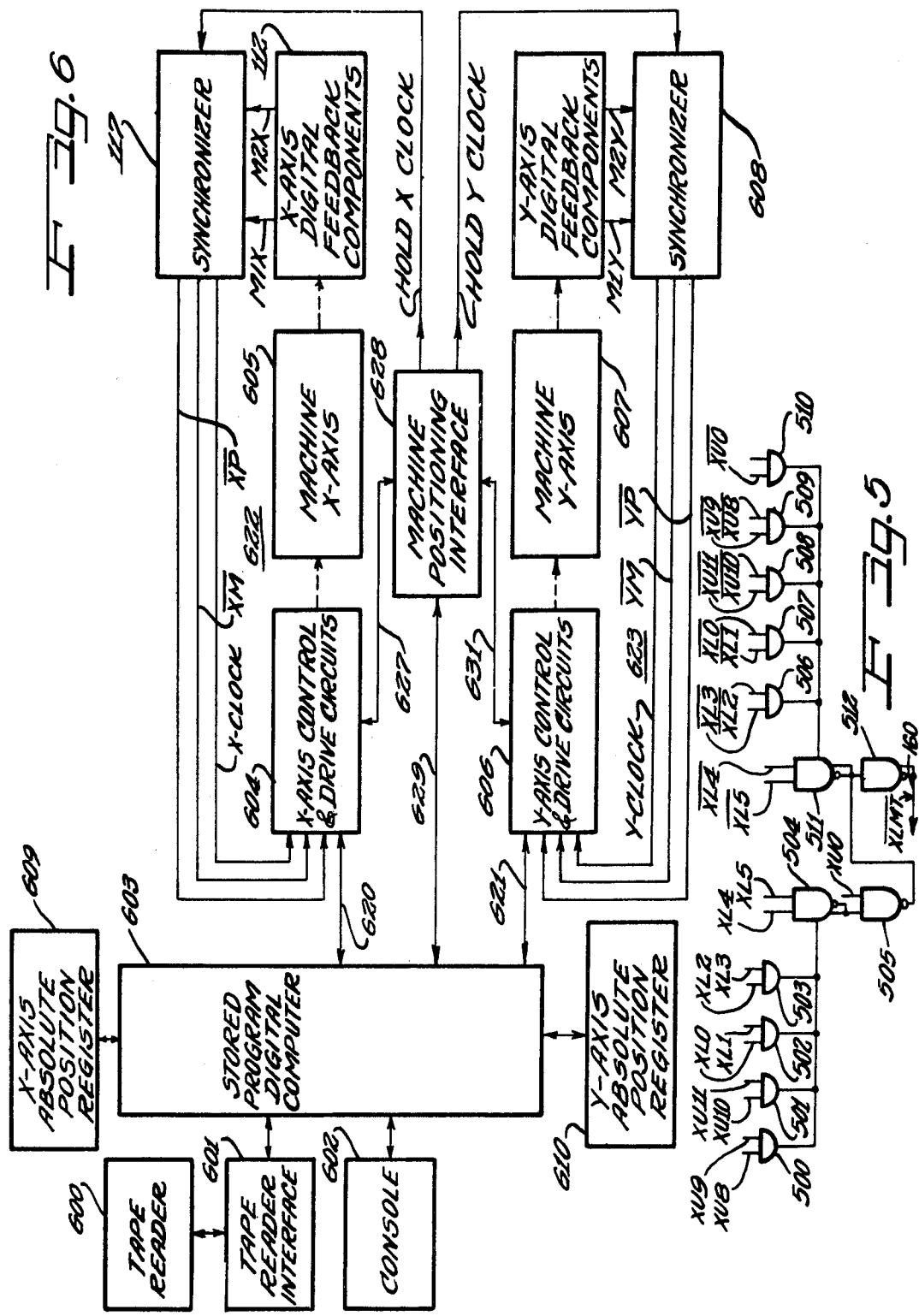

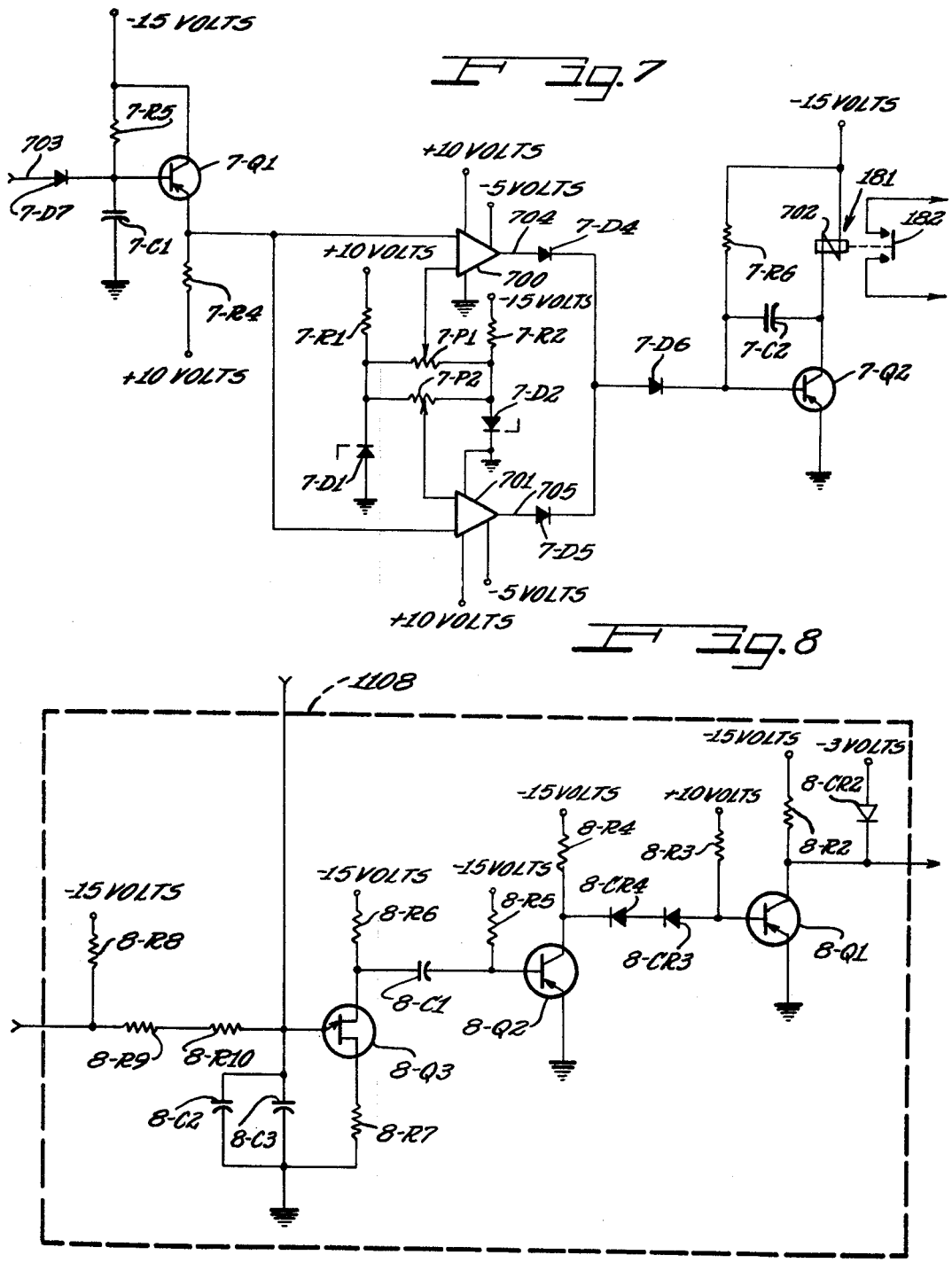

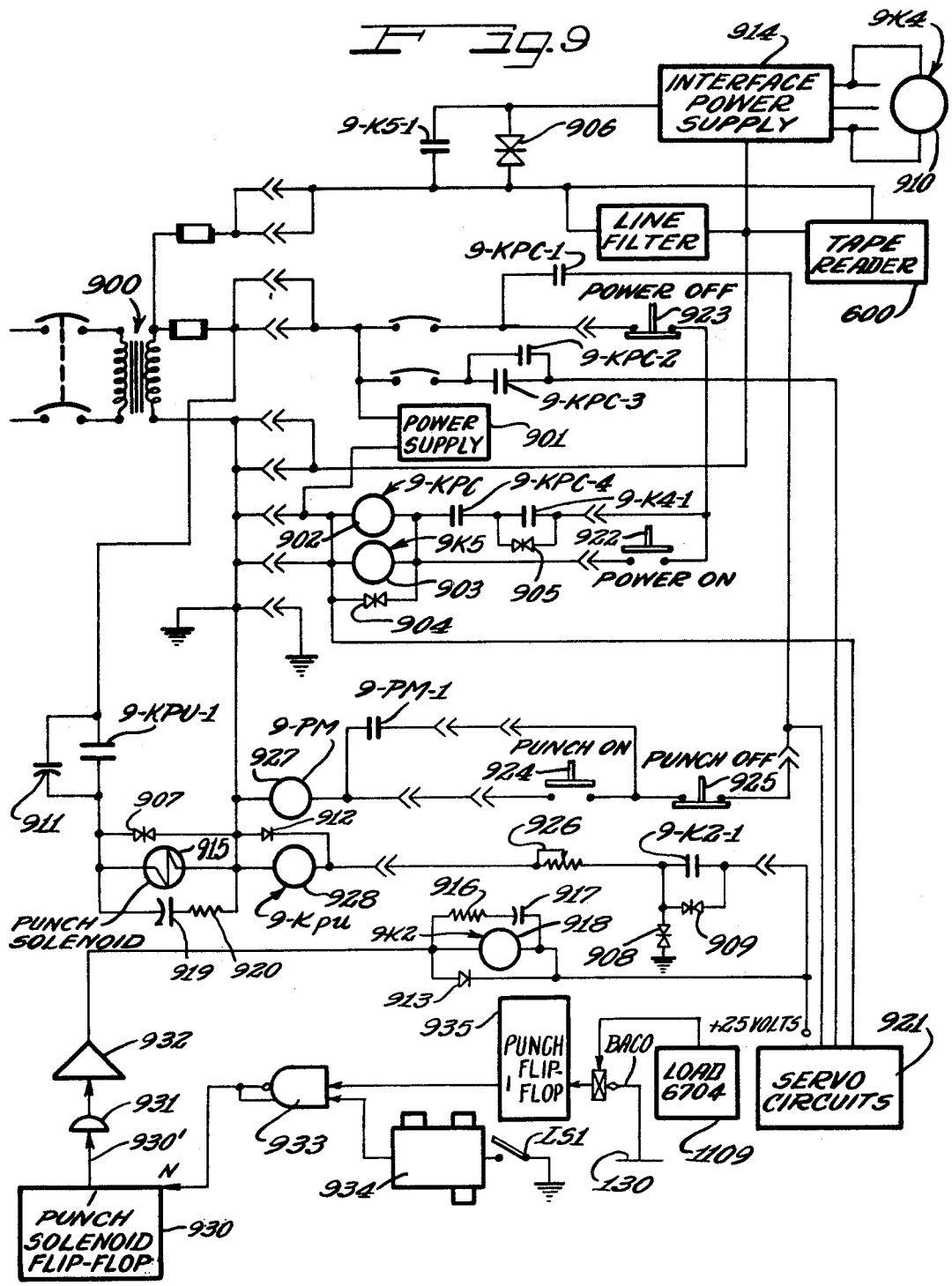

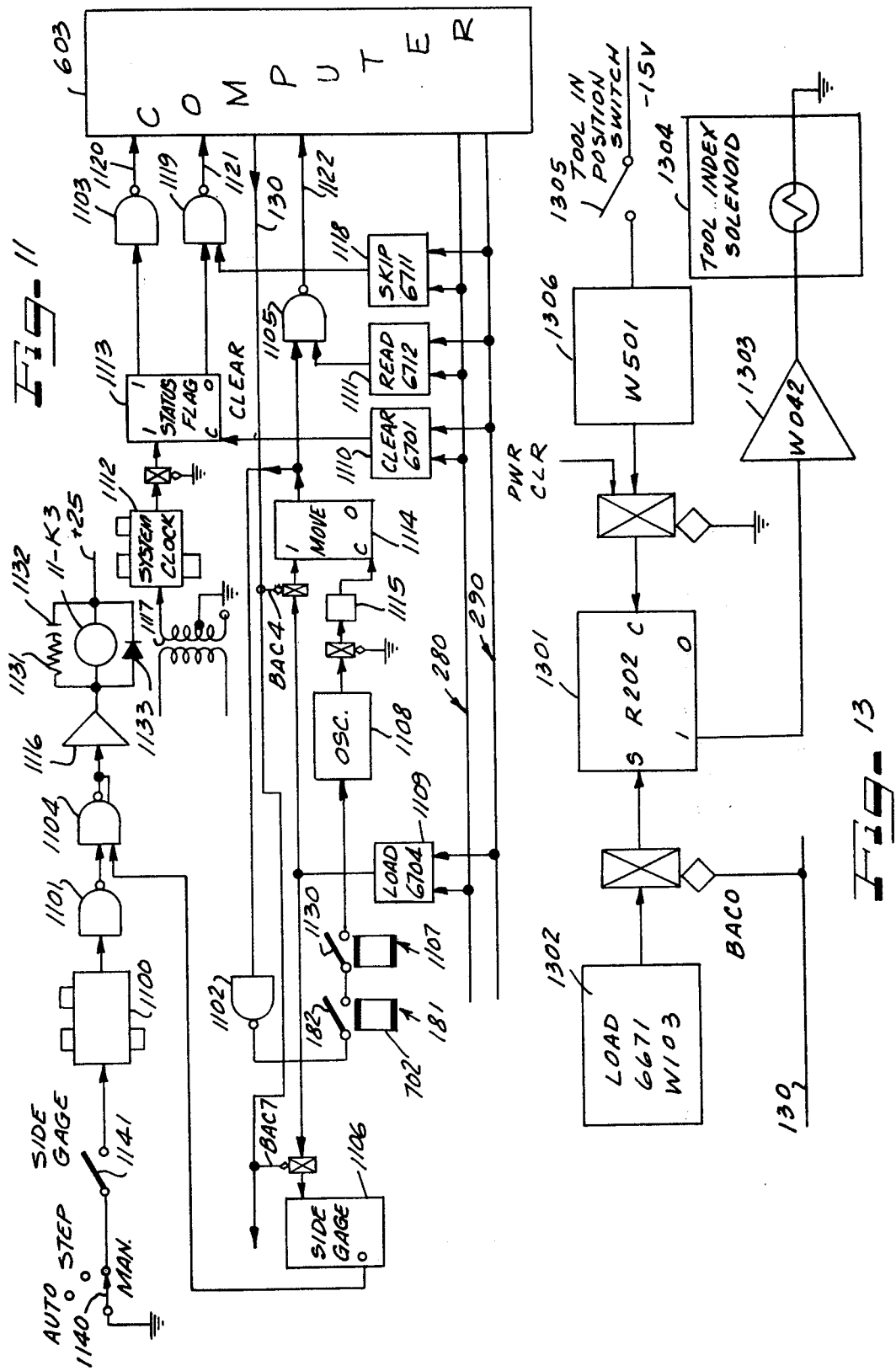

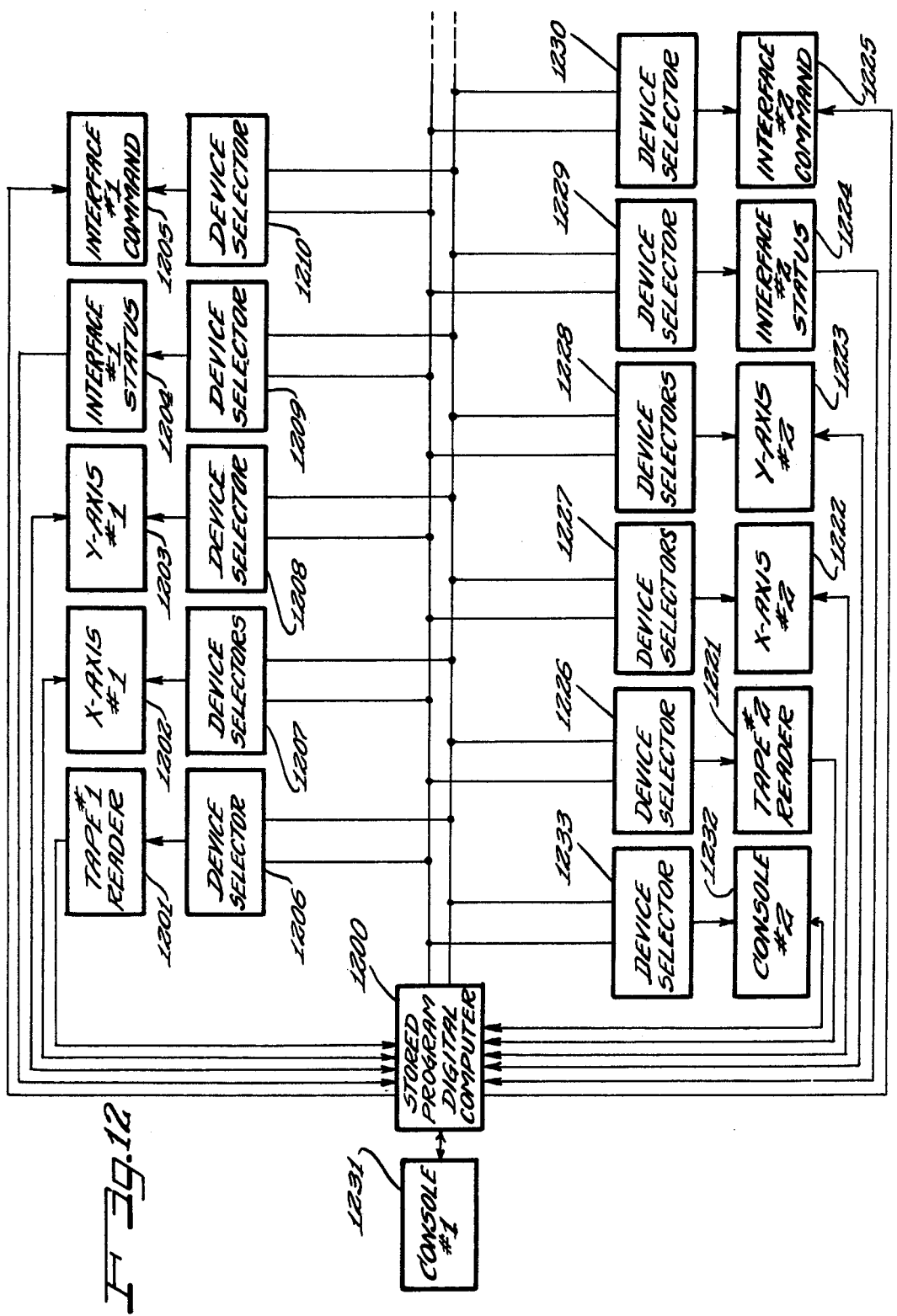

MACHINE TOOL CONTROL SYSTEM AND METHOD

Cross-References to Related Applications

The present application is a continuation of my pending applications Ser. No. 421,103 filed Dec. 3, 1973 and Ser. No. 426,602 filed Dec. 20, 1973 (now abandoned). Said applications are each a division of my earlier application U.S. Ser. No. 150,637 filed June 7, 1971 (now U.S. Pat. No. 3,816,723 issued June 11, 1974). Said application Ser. No. 150,637 in turn is a continuation in part of my application U.S. Ser. No. 744,392 filed July 12, 1968 (now U.S. Pat. No. 3,634,662 issued Jan. 11, 1972). Said application Ser. No. 744,392 is a continuation in part of my application U.S. Ser. No. 652,968 filed July 12, 1967 (now abandoned). My aforesaid application Ser. No. 150,637 also refers under 35 U.S.C. 120 to my applications U.S. Ser. No. 681,776 filed Nov. 9, 1967 (now abandoned) and U.S. Ser. No. 122,550 filed Mar. 9, 1971 (now U.S. Pat. No. 3,689,821 issued Sept. 5, 1972), said application Ser. No. 122,550 being a continuation of application Ser. No. 681,776.

My application Ser. No. 150,637 as filed incorporated by reference said applications Ser. No. 652,968, 681,776, 744,392 and 122,550, and the present application is a continuation in part of my applications U.S. Ser. No. 681,776 and 122,550.

BACKGROUND OF THE INVENTION

In existing machine tool control systems for punch presses and the like specialized numerical control hardware is furnished which is subject to rapid technical obsolescence. Said systems produce analog control signals for the drives of the respective machine axes corresponding to each successive positioning step, and signal the tape reader for more data as each step is completed. The preparation of numerical control tapes for the control systems is a time consuming and laborious process requiring separate facilities.

SUMMARY OF THE INVENTION

A basic objective of the present invention is to provide substantially more flexible machine tool control system capable of producing desired machine operations from basic data such as parts blueprints or the like with a substantially reduced overall expenditure of time and effort.

A further object of the invention is to provide such a machine tool control system and method which is competitive in cost with existing machine tool control systems.

Another basic objective is to provide a machine tool control system of substantially greater flexibility and throughput efficiency and yet which is of cost justifying its immediate introduction in job shops and other diversified parts production facilities.

A further object of the invention is to provide a machine tool control system and method capable of generating a coded record for a machine tool in response to both incremental and absolute input data in any desired order.

A still further object of the invention resides in the provision of a numerical control system and method enabling the changing of input commands to correct for previous minor positioning errors and/or mechanical tolerance errors so as to provide improved overall accuracy.

Still another object of the invention is to provide a numerical control system and method with provision for substantially expediting the generation of new numerical control programs.

Yet another object of the invention is to provide a system and method for facilitating the generation of machine positioning numerical control programs.

Another and further object of the invention is to provide a numerical control system and method capable of simultaneously controlling the operation of one or more machine tools and/or of assisting in the generation of new numerical control positioning programs for future use in controlling machine tools.

Still another and further object is to provide such a system capable of controlling the operation of a plurality of machine tools and simultaneously providing a stored program digital computer facility available for simultaneous program generation.

A more specific object of the invention is to provide a relatively economical and simple numerical control digital servo capable of accurately and reliably producing relatively large increments of movement in a given time interval.

A further more specific object is to provide such a digital servo having proportional slowdown which becomes effective as an end point is approached and which allows for a substantial overshoot without loss of positioning accuracy.

A still further more specific object of the invention resides in the provision of a digital to analog converter for supplying an analog error as a substantially linear function of plus or minus counts in the vicinity of zero while providing at least a limit value of analog error for digital input signals having a wide range of values at one side of the linear range.

The claims of the present application are directed to features not claimed in my U.S. Pat. No. 3,634,662 as follows:

(1) The present claims recite on-line connection means interconnecting the manually controlled input means, the source means and the stored programmed digital computer means to form one complete unitized device with a stored program digital computer means operable in a first mode to transmit to said computer memory means machine tool control instructions in accordance with coded input signals from the manually controlled input means for on-line manual generation of machine tool control instructions, and being operable in a second mode to transmit to said computer memory means machine tool instructions in accordance with a previously established sequence supplied from the source means for on-line editing of a previously established sequence of machine tool control instructions.

(2) A further feature relates to a unitized machine tool control system for a single machine tool operable both for generating new machine tool control instructions for the machine tool and for controlling movement of parts of the machine tool relative to respective machine tool axes so as to verify such previously established sequence.

(3) A further feature relates to a unitized machine tool control system for on-line manual generation of machine tool control instructions and on-line modification of a previously established sequence of machine tool constructions, and on-line operation of the machine tool selectively from the manually controlled input means and from coded record means.

Brief Description of the Drawings

FIGS. 1A and 1B show the X axis control circuits of a numerical positioning control system in accordance with the present invention, FIG. 1B being a continuation of FIG. 1A to the right, and dash lines being utilized to represent stages which have been omitted;

FIG. 2 is a diagrammatic illustration showing means for controlling the transfer of digital command signals from a stored program digital computer to the X and Y control circuits of a plurality of machine tools;

FIG. 3 is a diagrammatic illustration similar to FIG. 2 but showing the means for transferring data from the control circuits of the machines to the computer;

FIG. 4 is a schematic diagram showing details of the X axis synchronizer component of FIG. 1B, and also showing the circuitry controlling the X count inhibit line of FIG. 1A, and the connections to an absolute position readout device for the X-axis;

FIG. 5 is a diagrammatic showing of a limit gate circuit associated with the system of FIGS. 1A and 1B;

FIG. 6 is a block diagram illustrating an overall numerical control system and method in accordance with the present invention;

FIG. 7 is a schematic electric circuit diagram showing the circuit utilized for actuating the X-axis and Y-axis null detector relays, the circuit for the X-axis being specifically shown;

FIG. 8 is an electric circuit diagram showing the details of the relaxation oscillator circuit utilized in various parts of the present system;

FIG. 9 is a schematic electric circuit diagram showing the arrangement of certain relays and of the punch operating solenoid and indicating certain noise suppression features which have been incorporated;

FIG. 11 is a diagrammatic illustration of certain components of the machine interface system which provide for periodic interrupt operation of the computer and enable the computer to communicate with the control system servo circuits, to execute various auxiliary functions, to sense the end of a commanded movement, and to determine the status of various points of interest in the system during an interrupt cycle;

FIG. 12 illustrates a numerical control system in accordance with the present invention utilizing more than one machine control station and/or more than one operator's console station for time-sharing tape preparation and the like, the figure also indicating the feasibility of adding on additional control or console stations as desired;

FIG. 13 is a diagrammatic illustration of circuitry for enabling the computer to effect a tool change in response to an input command.

DESCRIPTION OF THE ILLUSTRATED EMBODIMENTS

Figure 1B:
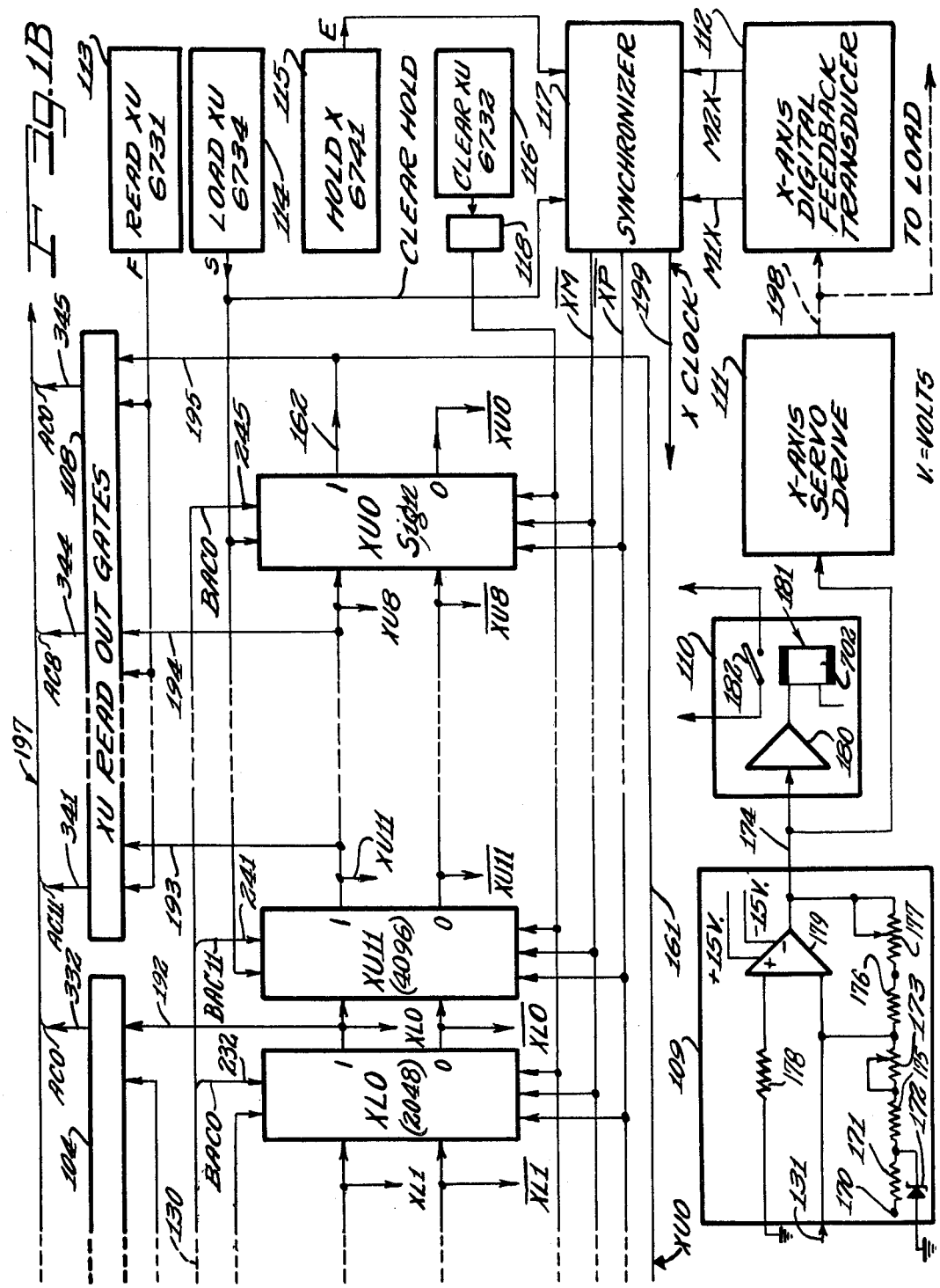

By way of introduction to the circuitry of a preferred embodiment in accordance with the present invention, the components shown in FIGS. 1–11 have been assigned respective general reference numerals, and a brief description of each such component is given in Tables I through XI of my U.S. Pat. No. 3,634,662. The components of each figure have in general been assigned three digit reference numerals wherein the first or most significant digit of the reference numeral corresponds to the first number, (the reference numerals in FIGS. 1A and 1B beginning at 100, those in FIG. 2 beginning with 200 and so forth) except that the same component appearing in successive drawing figures has received the same reference numeral. The tabulations also refer to a suitable commercial source where the component is commercially available, or otherwise identify or explain the structure of the component.

Operation of FIGS. 1A and 1B

In operation of the components of FIGS. 1A and 1B, digital command signals from the accumulator (AC) of computer 603 (FIG. 6) are supplied via bus cable 130. As indicated by reference characters applied to conductors branching from the cable 130, the input gates of counter stages XL11 and XU11 are connected with the BAC11 output from component 201, FIG. 2, of the computer output circuits 200. The read in gates for stages XL11 through XL0 are represented by block 203 in FIG. 2, and the read in gates for stages XU11, XU10, XU9, XU8 and XU0 are represented by component 204 in FIG. 2. The BAC10 terminal of the computer is connected with stages XL10 and XU10, the terminal BAC9 is connected with XL9 and XU9, and the terminal BAC8 is connected with XL8 and XU8. The terminals BAC7 through BAC1 are connected with counter stages XL7, XL6, XL5, XL4, XL3, XL2 and XL1, respectively. The BAC0 terminal of the computer is connected with the input gate of counter stage XL0 and also with the input gate of counter stage XU0, both shown in FIG. 1B.

Thus, when the load XL component 101 is selected by virtue of the output of component 201, FIG. 2, the gates 203, FIG. 2, will be enabled to load digital command signals from the computer into the XL counting stages. Similarly when the load XU component 114 is selected, digital command data will be loaded into the XU counting stages of FIG. 1B.

When a positioning cycle is then initiated, an error signal will be generated at the output 131 of the digital to analog converter stages 105–107 which will determine the direction and speed of operation of the X-axis servo drive 111. As shown in FIG. 1A, the complement outputs of stages XL11–XL6 are supplied via lines 141–146 to the inputs of the converter stages. The circuitry specifically referred to in Table I is such that when XL11 is clear, conductor 141 is held at minus 3 volts so as to provide a zero volt output from amplifier 151. On the other hand, when the counting stage XL11 is set, the output at line 141 is at ground potential, and amplifier 151 supplies a predetermined voltage increment with respect to the output line 131. If this output voltage increment is arbitrarily assigned a value of unity, then the outputs of amplifiers 152–158 would have relative values of 2, 4, 8, 16, 32, 64, and 128, respectively.

Conductor 160 leading to the input of amplifier 157 of converter stage 107 is connected to the output of inverter 512, FIG. 5. Conductor 161 leading to the input of amplifier 158 of converter stage 107 connects with the set output line 162 of counting stage XU0. Thus if stage XU0 is set, line 161 is at a potential of minus 3 volts and amplifier 158 contributes nothing to the output voltage at 131. On the other hand, if counting stage XU0 is in a clear (or reset) condition, then the output at line 161 will be at ground potential, and amplifier 158 will supply its relative voltage increment of 128. It will be observed that the connection 161 to the set output of counting stage XU0 differs from the connection of conductors 141-146 to the clear or complement output terminals of stages XL11-XL6.

The purpose of the illustrated connections to the respective counting stages and the desired functioning of the limit gate circuitry of FIG. 5 will be apparent from the tabulations entitled Table A1, Tables A2, Table B1, and Table B2 at columns 9 and 10 of U.S. Pat. No. 3,634,662 which show the operation of the circuits of FIGS. 1A and 1B for the case of a positive digital command signal and for the case of a negative digital command signal from the computer. The Tables A1, A2 and B1, B2 will be referred to in a collective sense as Tables A and B, respectively.

It will be observed from a consideration of Tables A and B that the amplifiers 157 and 158 of converter stage 107 are switched in such a way that for high positive counts above plus 63, the relative output from the converter stages at line 131 is maintained at a relative high value, for example above a limit value of plus 63. Between a count of plus 63 and minus 64, the output at 131 varies as a linear function of the count in the counting stages. For counts below about minus 64, the output at 131 is maintained at an absolute value above the limit value of about 64. Further, it will be observed that as the count in the counting stages increases from plus 63 to plus 127, the output at 131 continues to increase in a linear fashion. For a count of 128, however, the output at 131 falls to a value of plus 64 on a relative scale previously referred to. As the count further increases, the output at 131 again linearly increases to a maximum value of 127. This fluctuation in the output at 131 continues as the count in the counter stages continues to increase so long as the counting stage XU0 remains in the clear condition, and thus supplies an analog output of plus 128 which is substantially equal to the bias of minus 128 in the relative units which is introduced at amplifier component 109. Similarly, as the count in the counting stages progress below minus 64, the analog output at 131 will linearly increase in the negative direction until a count of minus 128. At a count of minus 129, the output at 131 abruptly decreases to minus 64. Further counting in the negative direction leads to a further linear change in analog output voltage until a count of minus 256 is reached. At a count of minus 257, the output at 131 again abruptly decreases to minus 64. It will be observed, however, that beyond a count of plus 63 and beyond (in the negative direction) a count of minus 64, the net analog voltage at output 131 never falls below an absolute value of approximately 63 in the relative units previously referred to.

Referring to circuit 109 in FIG. 1B, a bias reference voltage of plus 10 volts may be introduced at point 170. One terminal of a resistor 171 is connected to circuit point 170, and a Zener diode 172 is connected between the other terminal of resistor 171 and ground. A 1000 ohm potentiometer 173 may be adjusted with a count of zero registered in the counting stages so as to provide a zero analog output at 174 under these conditions. The values of the circuit elements in component 109 may be as follows: resistor 171, 510 ohms; voltage rating of Zener diode 172, 5.6 volts; zero adjustment potentiometer 173, 0 to 1000 ohms; resistor 175, 470 ohms; resistor 176, 100 ohms; gain adjustment potentiometer 177, 0 to 5,000 ohms; and resistor 178, 500 ohms. Amplifier component 179 may be a Burr Brown Model 1507 operational amplifier.

Null detector component 110 includes an amplifier circuit 180 which is adjustable by means of two potentiometers (7-P1 and 7-P2, FIG. 7) to actuate relay 181 whenever the input to the amplifier circuit 180 remains within a predetermined range about the zero error value. Thus one adjustment potentiometer of component 110 may adjust a first comparator (comparator 700, FIG. 7) of circuit 180 to provide an enabling output level whenever the input potential corresponds to a count in the counting stages of less than plus three, while the second adjustment potentiometer may adjust a second comparator (comparator 701, FIG. 7) to provide an enabling output whenever the count in the counting stages is greater than minus 3. Thus when both comparators 700 and 701 provide an enabling output level, the count will be between plus three and minus three. The normally open contacts 182 of relay 181 when closed may enable an energizing circuit for a relaxation oscillator (oscillator 1108, FIG. 11) which is adjusted to respond only when the energizing circuit remains closed for a predetermined time interval such as 100 milliseconds. Thus, if the count in the counting stages remains between plus 3 and minus 3 for 100 milliseconds, for example, (and if the Y null detector contact 1130 is closed during the interval), the relaxation oscillator will become operative to discontinue the positioning cycle.

Because of the operation of the null detector circuitry, it is possible for the machine axis to come to a stop with a count other than zero registered in the counting stages. The count remaining in the counting stages may be determined so as to be well within the tolerance requirements of the machine tool, and yet with many successive positioning steps, it is conceivable that the absolute error of a later end point with respect to a fixed reference point would be unacceptable. To deal with this possibility, provision is made for the computer to read the condition of the counting stages when the axis has stopped. The computer could be programmed in a number of different ways to take care of the problem, but in the illustrated embodiment, provision is made for the computer processor to algebraically combine the remainder in the counting stages with a succeeding command so as to provide a modified command signal to the control circuits which will correct for the error in the previous positioning operation.

For the purpose of determining the condition of the counting stages after the machine axis has stopped, the counting stages are provided with output lines such as those indicated at 186-195 leading from the set output lines of stages XL11-XL5, XL0, XU11, XU8 and XU0. Similar output lines would be provided for stages XL4, XL3, XL2, XL1, XU10 and XU9. The XL output lines such as 185-192 lead to an XL Read Out Gates component 104 controlled by a Read XL component 100. The XU Read Out Gates component 108 receives the output lines such as 193-195 of the XU counting stages and is controlled by the Read XU component 113. As indicated by the reference characters applied to the output lines of the XL Read Out Gates component 104, cable 197 connects with terminals AC11 through AC0 of the computer accumulator. Similarly the output lines from the XU Read Out Gates component 108, FIG. 1B, lead to terminals AC11, AC10, AC9, AC8 and AC0, respectively. The gate components 104 and 108 are, of course, enabled on different cycles so that the computer can distinguish the AC11 output of gate 104 from the AC11 output of gate 108, for example.

In the foregoing description, certain output lines which connect with the same terminal of the computer have been identified with a reference character indicating this fact. Specifically the designations AC0 through AC11, and BAC0 through BAC11 have this significance. Individual reference numerals have also been applied to the respective conductors bearing the more general reference character designations. It is believed that this procedure will facilitate comprehension of the drawings by those skilled in the art. Similarly in the following description the outputs from the XL and XU counting stages have been designated by the same reference characters as used for the respective counting stages. Thus, in FIG. 1A, an output line from the "set" output terminal of counter stage XL5 has been designated by the reference character XL5, while the output from the "clear" terminal of counting stage XL5 has been designated with the symbol for the complement of XL5 ($\overline{XL5}$). Referring to FIG. 1A, it will be observed that line 191 is connected to a common circuit point with line XL5 at the "set" output of counting stage XL5.) Certain other conductors have been given a general character designation and a reference numeral designation as well. See for example conductors 160 and 161 at the lower right in FIG. 1A.

Referring to the lower part of FIG. 1B, the output line 174 from amplifier 109 is connected to the input of the X-axis servo drive component 111 whose mechanical output is indicated by dash line 198. The transducer component 112 may be of the photoelectric type and include a suitable preamplifier so as to supply square waveform signals at the output lines M1X and M2X leading to synchronizer 117. The synchronizer component will enable the line designated as the complement of XM ($\overline{XM}$) if the transducer is rotating in one direction and will enable the line designated as the complement of XP ($\overline{XP}$) if the transducer is being driven in the opposite direction. The synchronizer 117 will also supply an X clock pulse at line 199 for each increment of rotation of the transducer 112. By way of example, the transducer may be mechanically coupled to the output shaft 198 in such a way as to produce an X clock pulse for each increment of rotation corresponding to a linear displacement of the machine axis of 0.001 inch. The X clock pulses from the synchronizer are supplied to the input of counting stage XL11 which is arranged so that each clock pulse causes the counting stage to change its state. The stage XL11 thus acts in the manner of a toggle switch or binary counting stage. If the line $\overline{XM}$ is enabled, the counting stages will count in the "up" or positive direction. On the other hand if the line $\overline{XP}$ is enabled, the "set" output of each counting stage is effectively coupled to the next succeeding counting stage so that the counting stages will count in the "down" or minus direction.

The Hold X component 115 causes synchronizer 117 to interrupt the supply of X clock pulses for a sufficient interval to ensure that the counting stages may be inspected by the computer. The "hold" interval introduced by actuation of component 115 is sufficiently short, however, so that any feedback pulse from transducer 112 which might occur during this interval could only be blocked for a portion of its duration. Thus even if a slight movement of the feedback transducer occurred during the hold interval, the count in the counting stages would reflect such movement (Further details of the "Hold X" operation will be apparent from the circuit shown in FIG. 4 and described below.)

After the computer has read out the condition of the counting stages with the machine axis essentially stopped, the computer will actuate Clear XL component 102 and the Clear XU component 116 to reset the counter to a zero reading in preparation for the transfer of a new digital command signal. Of course, if the read out from the counter shows an error in excess of tolerance, the computer may be programmed to delay clearing the counter, and to enable the servo drives for an additional interval.

Operation of FIGS. 2 and 3

In FIG. 2, the BAC output bus 130 has been indicated as leading to input conductors 221–232 of gate component 203. These same reference numerals have been applied in FIG. 1A and FIG. 1B to assist in correlation of these figures. Input conductors 221–227 as shown in FIG. 1A are also designated by reference characters BAC11 through BAC5 to indicate that these conductors are connected by means of cable 130 with terminals BAC11 through BAC5 of component 201, FIG. 2. Similarly, conductor 232 in FIG. 1B has also been designated by the reference character BAC0 which is the terminal to which this conductor connects at component 201. The input conductors to gate component 204 in FIG. 2 have been designated by reference numerals 241–245 and lead, respectively, to terminals BAC11, BAC10, BAC9, BAC8 and BAC0. In practice, the cable 130 may lead to a connector at the component 203, and a further cable such as indicated at 130a may lead from component 203 to component 204, while cable 130b may lead from component 204 to component 205, cable 130c may lead from component 205 to 206, and cable 130d may lead to a further component of a second machine tool, for example. By actuating components 203, 204, 205, 206 and subsequent corresponding components in sequence, a desired number of components may all connect with terminals BAC11 through BAC0 of component 201. Thus, conductors 251–262 of gate 205 would connect with terminals BAC11 through BAC0 of component 201 and conductors 271–273 of component 206 would connect with terminals BAC11, BAC10 and BAC0 of component 201.

The manner of selection of gates such as 203–206 in sequence is explained in detain in *The Digital Small Computer Handbook* (cited in Table II, supra) at pages 429 and 430, and a specific circuit is disclosed for components 101, 114, 207, and 208 in *The Digital Logic Handbook* (cited in Table I, supra) at page 142, and these disclosures are incorporated herein by reference. In general, the BMB cable 280 from component 201 (or two multi-conductor cables as represented by line 280) may contain at least 12 conductors. Lines 281–284 may represent connections from one of each of six pairs of conductors of cable 280 to components 101, 114, 207 and 208, for example. The memory buffer register of the computer may have bits 3–8 thereof connected at both the binary 1 and binary 0 outputs thereof to the component 201, and cable 280 may connect with terminals MB3(1) through MB8(1) and MB3(0) through MB8(0) of component 201. The corresponding outputs of component 201 would be BMB3(1) through BMB8(1) and BMB3(0) through BMB8(0). It may be noted that the convention used for the selectors herein is to use the middle two digits of the code numbers of the selectors to indicate the octal complement of the BMB selection pattern. The final digit indicates whether an 10T1, 10T2 or 10T4 pulse is supplied. The initial 6 in the code indicates an input/output selection signal. Thus the selector 101 with a code of 6724 would be addressed on BMB cable 280 by a selection code of 72 (octal), with the final digit 4, indicating that an 10T4 is to be transmitted. Thus, taking the selection code for component 101 as 72 (octal), the following terminals would be connected to component 101 via cable 281: BMB3(0), BMB4(0), BMB5(0) and BMB6(1), BMB7(0), BMB8(1). To give one further example, if the code for component 114 is 73 (octal), then cable 282 would connect with the following terminals: BMB3(0), BMB4(0), BMB5(0) and BMB6(1), BMB7(0), BMB8(0). It is evident that any number of additional device selectors may be assigned two digit octal codes (up to a total of 63 in decimal notation). The operation of each of the selector components such as 101, 114, 207, 208 in FIG. 2 and such as 100, 113, 302 and 303 in FIG. 3 will be apparent from the foregoing description.

In FIG. 2, branch cables are indicated at 285-288 leading from IOP cable 290 to selectors 101, 114, 207 and 208, respectively. The cable 290 is connected to the output of an 10P bus generator component 291 of the computer, and the cable 290 may comprise three conductors carrying respective pulses 10P1, 10P2, and 10P4 as described, for example, in *The Digital Small Computer Handbook*, supra, at pages 88-90, pages 221-223, and pages 426-427, and this description is incorporated herein by reference. The device selector components when enabled regenerate the respective 10P pulses as 10T command pulses. The positive or negative version of any of the successive regenerated pulses 10T1, 10T2 or 10T4 may be supplied via output lines such as indicated at 291-294 in FIG. 2. The output terminals in FIG. 2 to which conductors 291-294 are connected are designated by letters which correspond to the distinctive letters in the terminal designations utilized in the commercially available module W103. Thus, terminal S of selector 101 may supply an initially positive-going version of the 10T4 pulse, the T terminal of selector 100 may supply an initially negative-going 10T4 pulse, for example, and the terminal F of selector 113 may supply an initially negative-going 10T1 pulse. The timing of the 10T cycle is shown at page 425 of *The Digital Small Computer Handbook*, supra, and this disclosure is incorporated herein by reference.

In FIG. 3, the reference numeral 197 designates generally the cable extending between the accumulator terminals AC11 through AC0 of the computer and the successive gate components such as 104, 108, 300 and 301. As mentioned with reference to cable 130, the cable 197 may actually comprise successive lengths of multi-conductor cable, for example connecting from component 301 to the computer, connecting between components 300 and 301, connecting between components 108 and 300, and connecting between components 104 and 108. Further lengths of cable may connect gate component 104 with gate components for other axes or for the axes of other machines, or separate buffering may be utilized in conjunction with a separate cable directly from the computer as will be apparent to those skilled in the art.

In FIG. 3 conductors leading from components 104, 108, 300 and 301 have been assigned reference numerals 321-332, 341-345, 351-362 and 371-373. The reference numerals 321-327, 332 and 341, 344 and 345 have been applied to the corresponding conductors in FIGS. 1A and 1B. Conductors 321-332 connect with terminals AC11 through AC0 of the computer, conductors 341-344 connect with terminals AC11 through AC8, conductor 345 connects with terminal AC0, conductors 351 through 362 connect with terminals AC11 through AC0, conductors 371 and 372 connect with terminals AC11 and AC10, and conductor 373 connects with terminal AC0.

The structure and function of conductor cables 385-388 and conductors 391-394 in FIG. 3 will be apparent from the comparable discussion with respect to cables 285-288 and conductors 291-294 of FIG. 2.

Operation of FIG. 4

In FIG. 4, 90° out of phase rectangular waveforms arrive at lines M1X, M2X from the digital feedback transducer 112, FIG. 1B. The function of the synchronizer circuit is to energize output line $\overline{XM}$ (complement) for one direction of rotation of the transducer, and to enable the output line $\overline{XP}$ (complement) for the opposite direction of rotation of the transducer. For one direction of rotation of the transducer the input at M2X leads the input at M1X by 90°, and for the other direction of rotation of the transducer, the input at M1X leads the input at M2X by 90°. If a positive signal level first appears at conductor 420 in a cycle of operation, for example, gates 421 and 422 will be enabled. A subsequent positive going signal at 423 is then transmitted via line 424 to the pulse input of gate 421, and a negative going pulse at the input of pulse amplifier 404 generates a positive pulse at line 425 leading to gate 426. Gate 426 is enabled if flip-flop 407 is clear, and a negative pulse is transmitted to the set input of flip-flop 406 placing this flip-flop in a set condition. The result is a negative output level at conductor 427 which serves to disable gate 428 at the input of flip-flop 407. The negative level at the input of driver amplifier 408 results in an enabling level at the output conductor 429 connected with conductor $\overline{XM}$ (complement). The setting of flip-flop 406 produces a positive going pulse at output line 431 leading to NOR gate 410, which thus supplies a negative going pulse to NAND gates 411 and 412. With flip-flop 413 in a clear condition, output line 432 thereof is negative enabling gates 411 and 412. Gates 411 and 412 thus transmit positive going pulses to the relaxation oscillator components 414 and 415. If the oscillator 414 supplies a positive going output pulse after a delay of 27 microseconds, while the component 415 supplies a positive output pulse after a delay of 32 microseconds, the result will be the transmission of a clock pulse of 5 microsecond duration to output conductor 199. When the output of component 415 goes positive, it serves to clear flip-flop 406, disabling line $\overline{XM}$ (complement) and supplying a negative potential at line 431 which is transmitted by gates 410 and 411 to shut off oscillator 414 and place the circuit in condition for a further cycle.

If now the negative going portion of the waveform at 420 leads the negative going portion of the waveform at 423, gates 441 and 442 will be enabled, and the negative going waveform at 423 will be transmitted by inverter 403 as a positive going pulse, resulting in a negative going pulse at the output of gate 441. Thus, output line $\overline{XM}$ (complement) will continue to be enabled, causing the counting chain of FIGS. 1A and 1B to count up. Thus, the operation of the circuit continues so long as the transducer component 112, FIG. 1B, continues to rotate in the same direction.

If the direction of rotation of the transducer reverses, the waveform at 423 will go positive (to ground potential) 90° ahead of the waveform at 420, enabling gates 451 and 452. The subsequent positive going pulse of the waveform at 420 is transmitted by gate 452 as a negative pulse triggering pulse amplifier 405 and serving to place flip-flop 407 in the set condition. In this case, output line 453 is driven negative to place line $\overline{XP}$ (complement) in enabling condition, and thus causing the counter to count down. At the same time, the positive or ground level output at conductor 455 is transmitted by NOR gate 410 and by NAND gates 411 and 412 to trigger oscillators 414 and 415 and generate a further clock pulse at line 199. Similarly, on the next half cycle of the waveforms at 420 and 423, gates 461 and 462 will be enabled through inverter component 403, and flip-flop 407 will be again placed in set condition to generate another clock pulse at line 199.

The oscillators 414 and 415 preferably employ the circuit of FIG. 8, but with modified values for circuit elements 8-R9, 8-R10, 8-C2 and 8-C3 as follows: for oscillator 414, total series resistance (8-R9 plus 8-R10) 10,000 ohms, and total shunt capacitance (8-C2 plus 8-C3) 0.0022 microfarad; for oscillator 415, total series resitance 15,000 ohms, and total shunt capacitance 0.0022 microfarad.

For the sake of convenience there has been added to the showing of the synchronizer in FIG. 4 a representation of the X-axis transducer circuits component 112 which supplies the M1X and M2X waveforms. The transducer also supplies a pulse MLX upon each complete revolution thereof at a predetermined point. These revolution marker pulses MLX are supplied via a conductor 440 to the input of inverters 416 and 417. The output of the trigger 419 is normally at ground potential to enable the gate at the input of flip-flop 418, so that the pulses from inverter 417 are transmitted to the set input of the flip-flop maintaining the flip-flop in a set condition. When however the carriage of the machine tool approaches the extreme right limit of its travel (along the X axis), the right limit switch 441 is closed and remains closed as the carriage continues its movement to the right. This provides a negative level output from trigger 419 blocking the MLX pulses and placing the flip-flop 418 in a clear condition. The result is a negative potential at the output of gate 436 which disables the input gates in input lines 119 and 119a leading to the first counting stage XL11, FIG. 1A. The X count inhibit line has been given the reference designation 445 in FIG. 1A and in FIG. 4. If selector 1140 is placed in the manual position, the output of trigger 434 is at a negative level, the output of inverter 435 is at a ground level, and the output line 445 is at the negative count inhibiting potential regardless of the condition of the right limit switch 441. This circuitry will therefore illustrate the manner in which provision may be made to place the machine tool under manual control.

Where the count has been inhibited because of the operation of the right limit switch 441, the count will be resumed after the carriage releases the limit switch to its open condition and the first marker pulse MLX is received. The carriage is not programmed to move to its extreme limit, so that limit switch 441 would not be closed in the course of the correct execution of a program.

Operation of FIG. 5

In FIG. 5, components 500–504 constitute a negative input NAND gate and a positive input NOR gate, and the same is true of components 506–511. The set outputs of counter stages XU8 through XU11 and XL0 through XL5 are thus connected to one gate circuit, while the complements, the clear outputs of the same counting stages together with the clear output of counting stage XUO are supplied to the righthand gate circuit shown in FIG. 5. A study of the gate circuitry will reveal that the operation indicated in Tables A1, A2 and B1, B2 will be obtained with this gate arrangement. Thus, for a high positive count, counting stage XUO will be in a clear condition providing a negative level input at gate 510, while one or more of the other inputs to gates 506–511 will be at ground potential corresponding to a set condition of the associated counting stage. The gate 511 acting as a positive or ground input NOR gate provides a negative level at the input to gate 512. Similarly, with counting stage XUO clear, the set output XUO will be at ground potential at the input of gate 505, providing a negative level at the output of gate 505. The negative input to gate 512 results in a ground level output which when supplied to amplifier 157 causes the amplifier to provide an analog voltage increment having a relative value of +64. Thus, even if each of stages XL11 through XL6 is in clear condition, the output at 131 of the converter stages will always be at least plus 64 where the output of amplifier 151 is taken as a relative value of unity.

When the count in the counter is plus 63 or less, all of the counting stages above XL6 will be in a clear condition, providing a negative level input to each of gates 506–511. The result will be a ground level input to gate 512 and a negative level output from gate 512 which serves to switch off converter amplifier stage 157.

When the count in the counter goes to minus 1, counting stage XUO assumes a set condition, providing a ground level input to gate 510 and a negative output from gate 511. Since all the stages above XL6 will be in set condition, there will be a negative level input to each of gates 500–504, resulting in a ground level output from gate 504 and a negative level output from gate 505. The negative level input to gate 512 results in a ground level output from gate 512 agan enabling converter stage 157.

When the counting stages reach a negative value above minus 64, one or more of the counting stages above XL6 will be in a clear condition, providing a ground level input to one of the gates 500–504 and thus a negative level output from gate 504. The set output of XUO is also negative resulting in a ground level output from gate 505 and a negative level output from gate 512 which serves to disable the converter stage 157.

Operation of FIG. 6

Referring to FIG. 6, computer 603 may have a first stored program therein enabling it to interpret command input numerical positioning data from components 600, 601 so as to transmit the data via communication channels such as generically indicated at 620 and 621 to the upper and lower stages of the X axis and Y axis counting chains. Once these digital command signals have been transmitted to the digital servo loops which are generally designated by the reference numbers 622 and 623, the servo loops are capable of independent functioning in initially driving the respective machine axes 605 and 607 at relatively high speed toward the commanded end points. When the respective axes come within about 0.063 inch of the respective end points, for example, the digital to analog converter stages of FIG. 1A provide a proportional analog error signal, and the machine axes in response to the diminishing magnitude of the analog error signal progressively slow down the respective axes. The linear region of the converter stage error signal as a function of count is such as to enable an overshoot of for example 0.063 inch without losing control of the axis. As soon as both axes remain in the vicinity of the required end point for the required time, the null detector components such as X-axis null detector 110, FIG. 1B, signal the computer, for example via channel 627, machine positioning interface component 628 and channel 629. Other operations of the computer 603 may thus be interrupted by means of a program interrupt signal from the interface 628, at which time the computer will energize the axis Hold component such as 115, FIG. 1B and read the contents of the associated counter chain. The stored program then may result in the combining of the remainder read from the counting chain with the new command in such a way as to compensate for any tolerance error in the preceding positioning cycle. Thus, if in the preceding cycle the X-axis had moved one count too far in the positive direction, and the next command were for a positive movement, this one count would be subtracted from the new positive command signal, and the result entered into the X-axis counting chain in the next cycle.

When both axes have sufficiently approached their end points to actuate the associated null detector circuits, the computer 603 is advised, for example via channels 627, 628, 629 and 631, 628, 629. The computer is then in a position to determine if a punch, tool change, or other operation should be initiated before a new positioning cycle takes place. Such commands may be transmitted as illustrated in FIGS. 9 and 11.

The computer may have a further stored program so as to enable the generation of new programs from the console 602 simultaneously with the machine control operation. This second stored program may greatly facilitate the generation of new programs, for example by automatically keeping track of block number, storing successive blocks without actually punching the same in a record tape, and advising the operator when he has programmed a move off the piece part. while the program being generated is stored in the memory of the computer, any items thereof may be recalled to the console 602 for modification or checking, and the computer may also provide arithmetical checks and the like. When desired, the operator can then signal the computer to read out the numerical control program so generated from its memory and enter the program on punched tape or the like. It has been found in practice that the assistance of a stored program in the computer during numerical control program preparation greatly speeds this operation.

FIG. 7

FIG. 7 shows the circuit actually employed for the null detector component 110, FIG. 1B. Potentiometers 7-P1 and 7-P2 are adjusted to enable operation of relay 181 for input voltages at 703 of relatively positive and relatively negative values, respectively. To adjust the potentiometers, a signal of the threshold value corresponding to the plus or minus count limit desired is supplied at 703 and an oscilloscope is connected at the relevant test point 704 or 705. The associated potentiometer 7-P1 or 7-P2 is then adjusted until the signal at the test point shifts between a relatively positive potential and a relatively negative potential. Back and forth manual adjustment of the potentiometer in the neighborhood of the correct setting will cause the output at the test point to oscillate between the two potential levels, and the potentiometer may thus be set at substantially the critical setting which corresponds to the threshold level input. As previously described in connection with FIG. 1B, when both comparators 700 and 701 provide an enabling output level, the relay 181 will be energized signifying that the error count is between the desired plus and minus values (such as plus three and minus three).

FIG. 8

FIG. 8 shows an exemplary circuit for relaxation oscillator 1108 of FIG. 11. The oscillators 414 and 415, FIG. 4, have comparable circuits but with components 8-R9, 8-R10, 8-C2 and 8-C3 selected to give the desired time constants for the respective circuits. Oscillator 1108 may be constructed to provide a delay of 100 milliseconds, for example, so as to preclude response in the case of momentary closure of the contacts 182 and 1130 (FIG. 11) of the X and Y null detector relays 181 and 1107.

FIG. 9

FIG. 9 shows certain relay circuitry and includes a push-button 922 for establishing "power on" condition, and a pushbutton 923 for shutting off power. A further pushbutton is shown at 924 controlling energization of relay 9-PM which controls punch motion. A further pushbutton 925 serves to disable punch motion. The computer may supply an enabling potential to line 930 for energizing relay 9-K2 controlling energization of punch solenoid 915.

It has been found important to provide arc suppressing elements and damping circuits as indicated for example, at 911, 919, 920, 907, 912, 913, 916, 917 to avoid the generation of noise which might adversely affect the accuracy and reliability of the positioning operation. Steps were also taken to shield and remove critical signal lines from probable transient lines (especially those having inductive loads) and to run these transient lines e.g., servo armature and field, relays and solenoids, in twisted pairs to reduce electrical interference.

FIG. 10

Figure 10:
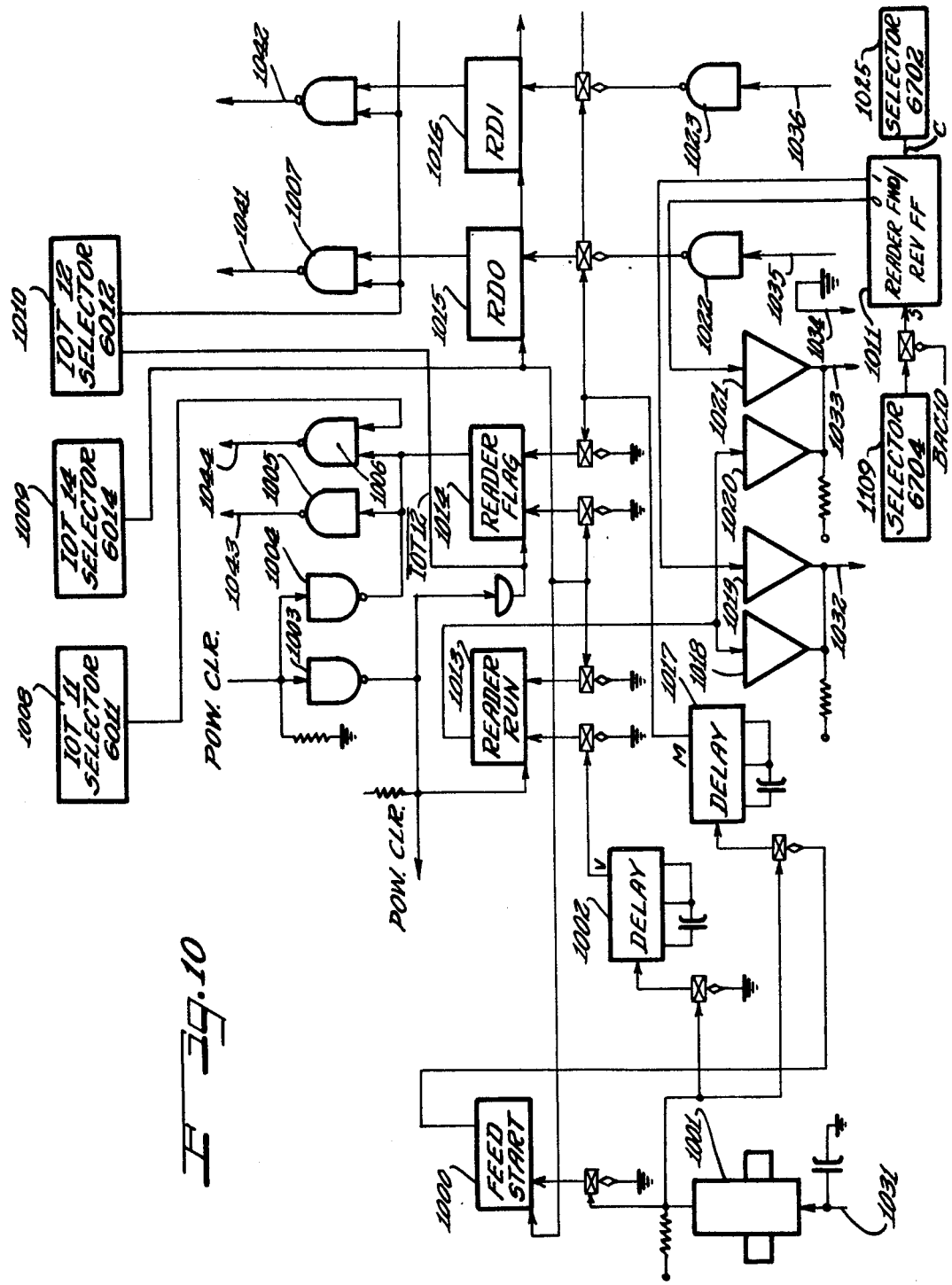
FIG. 10 is a diagrammatic illustration of a representative portion of the tape reader interface component utilized in the illustrated system.

FIG. 10 illustrates exemplary details of the tape reader interface component 601 of FIG. 6. A portion of the circuit is illustrated including conductors 1031–1036 which are detachably connected with circuits in the tape reader 600 known respectively as "OV" channel from which sprocket hole pulses are received, "run, stop, forward" channel, "run, stop, reverse" channel, "ground", "data channel 8", and "data channel 7". Data channels 6 through 1 of the tape reader may be connected to circuits corresponding to the circuit 1022, 1015, 1007 (associated with data channel 8) for transmitting data to the computer via conductors such as indicated at 1041 (for data channel 8) and 1042 (for data channel 7). Conductors 1043 and 1044 connect with the program interrupt request bus 1120 (FIG. 11) and the skip input bus 1121 (FIG. 11) of the computer. See *The Digital Small Computer Handbook*, supra, pages 425, 430–431, and 435–436 for further details. When a line of data has been read into the register including components 1015 and 1016, the reader flag flip-flop 1014 is set normally to transmit an interrupt signal to the computer. The computer responds to the interrupt signal after completing the current instruction, storing the number of the next instruction in a predetermined memory location and proceeding to determine the cause of the interrupt signal. The computer may then respond to actuating selector components 1008–1010 (which constitute a single device selector Module W103). The 10T1 negative pulse on the output line from component 1008 serves to advise the computer of the status of reader flag 1014. The IOT2 negative pulse from component 1010 serves to interrogate the line of gates such as 1007, the information stored in the corresponding line of registers such as 1015 and 1016 being accepted by the computer if reader flag component 1014 indicates that new information is present (via skip conductor 1044). The IOT2 positive-going pulse from component 1010 may be supplied to conductor IOT2 to "reset" or "clear" the reader flag flip-flop 1014. (The IOT12 conductor may connect with terminal AL of the commercial Module type W103 previously referred to.) The IOT4 positive-going pulse from component 1009 then serves to reset register components 1015 and 1016, and to insure that reader flag component 1014 is reset. It also serves to clear or reset feed start flip-flop 1000, and to set reader-run flip-flop 1013. An enabling potential is then supplied at conductor 1032 to restart the tape reader which then transmits another line of data, and a further sprocket pulse to conductor 1031 which serve to again reset the reader-run flip-flop 1013 and to set the reader flag flip-flop 1014 to repeat the cycle. FIG. 11.

FIG. 11 illustrates the manner in which the computer may be controlled to cyclically scan for interrupt conditions. Transformer 1117 may supply alternating current of commercial frequency such as 60 cycles per second to system clock trigger 1112 which thus under normal operating conditions will serve to set the status flag flip-flop 1113 60 times per second. The "set" output of status flag component 1113 is supplied to the computer via inverter 1103 and conductor 1120 so as to place the computer in the interrupt mode, the computer than completing the current instruction, storing the address of the next instruction of the regular program in memory, and proceeding to scan the various flag flip-flops such as status flag component 1113, FIG. 11, and reader flag component 1014, FIG. 10.

The manner in which the status of various flip-flops may be read into the computer in response to an interrupt signal is typified by the example of the move flip-flop 1114. When an interrupt signal has been received, the computer may actuate read selectors such as 1111 and 1112 which may enable gates such as indicated at 1105 and 1119 to transmit the status of twelve different flip-flops, for example, via computer input cable 197, FIG. 3. Thus conductor 1122 at the output of NAND gate 1105 may lead to terminal AC4 of the accumulator of the computer.

The "clear" or "reset" output of flip-flop 1113 partially enables NAND gate 1119 when the flip-flop is reset. When the selector 1118 is selected by the computer (by means of BMB cable 280), the IOT1 pulse of negative polarity which is transmitted to gate 1119 from the selector 1118 causes a positive pulse to be transmitted from the output of gate 1119 to the computer 603 via conductor 1121. The 12 bit word thus transmitted to the accumulator is compared with the previously transmitted word which has been stored in the computer memory, by subtracting the one word from the other. If the result is zero, then there has been no change in status. If the result is of some other value, then by assigning the input signals different predetermined binary weights, the computer knows which of the flip-flops such as move flip-flop 1114 has signalled a change in status.

As soon as the computer has responded to the call for interrupt service, for example responding to the completion of a positioning movement by setting punch flip-flop 935, FIG. 9, which controls the punch solenoid 915, FIG. 9, the computer may resume its normal operation by transferring the next instruction location from its memory and proceeding with the execution of this instruction.

The manner im which the computer may direct operations of the system in response to input commands is also illustrted in FIG. 11. Thus the output bus cable 130 from component 201, FIG. 2, is shown having a connection with an input gate of the move flip-flop 1114 and of the side gauge flip-flop 1106. For example, terminal BAC4 may connect with the gate leading to move flip-flop 1114 and terminal BAC7 may connect with the leading to the set input of side gauge flip-flop 1106. Thus if the associated register in the computer provides an enabling potential at terminal BAC4 and then actuates selector circuits such as 1109 and 1110, the move flip-flop 1114 will be set, and a ground level will appear at reset output 1140.

When contact 182 of the X-axis null detector relay 181 and contact 1130 of the Y axis null detector relay 1107 have been simultaneously closed for the requisite time interval, oscillator component 1108 will be effective to reset the move flip-flop 1114. This new condition of the move flip-flop 1114 will then be detected by the computer at the next interrupt service cycle.

Similarly, the computer might provide an enabling potential at terminal BAC7 and then actuate the selector 1109 so as to energize side gauge flip flop 1107 which controls side gauge solenoid 11-K3. Relay 11-K3 is shunted by a resistor 1131 having a value of 100 ohms and a capacitor 1132 having a value of 1 microfarad in series, and is also shunted by a diode 1133 to avoid the generation of noise in the critical components of the system.

A manually operable switch is indicated at 1140 having three positions "manual", "step" and "automatic". When the selector switch 1140 is in the manual position, a manual side gate switch 1141 may be actuated to energize the side gauge relay 11-K3. The circuitry of FIG. 11 will be sufficient to indicate to those skilled in the art the manner in which the circuitry may accommodate either command signals from the computer or manual commands directly by the operator of the punch press. The components of FIG. 11 are typical of the circuitry which may be represented by the machine positioning interface component 628 of FIG. 6. The interface 628 may also include components such as selector 115 shown at the upper right in FIG. 4 and flip-flop 413 for generating the "Hold X Clock" signal at line 432, for example.

FIG. 12

FIG. 12 illustrates a numerical control system wherein a stored program digital computer 1200 such as the Digital Equipment Corporation PDP-8 or PDP-8S computer services a plurality of machine tools such as the machine tool system represented by components 1201-1210 and the machine tool system represented by components 1221-1230. The computer 1209 may further service a first console 1231 in the normal manner as described in the publication reference DEC-B.

FIG. 12 also illustrates how a second console 1232 may be serviced by the computer 1200 which the aid of a device selector 1233. Thus the console 1232 may be included in the stations scanned by the computer 1200 during each interrupt cycle, and the computer may communicate with console 1232 by actuating the device selector 1233 whenever this console requires service.

FIG. 12 thus illustrates the extreme flexibility of the numerical control system contemplated herein. For example, additional machines or consoles may be added to a system in the field whenever the need arises.

FIG. 13

FIG. 13 illustrates how the control system may effect a tool change in response to a command from punched tape, for example. Thus, in response to a command from the punched tape input, the computer may load a bit in its output register for delivery via conductor BACO of cable 130 to a flip flop 1301 which when actuated serves to step a tool positioning device to a predetermined position. A suitable device selector 1302 (with octal code number 6671, for example) is then actuated to set the flip-flop 1301, and the flip-flop 1301 in its set condition enables the tool positioning means including amplifier 1303 and step by step solenoid drive 1304 until the flip-flop 1301 is reset by the tool associated with the flip-flop reaching the operating position. Specifically when the selected tool reaches operating position, switch 1305 closes and causes trigger circuit 1306 to transmit a reset pulse to flip-flop 1301. Examples of Computer Operation in Machine Control Mode The following Tables C1 and C2 will concretely illustrate computer operation to adaptively compensate succeeding commands for many previous positioning errors.

Table C1

X-Axis (Positive Error)

| | | |
|---|---|---|
| Error | 0 1 0 0 0 0 0 0 0 0 0 0 : 0 0 0 0 0 | +2 |
| New Move | 0 0 0 0 1 0 0 0 0 0 0 0 : 0 0 0 0 0 | +16 |
| Add Error | 0 1 0 0 0 0 0 0 0 0 0 0 | |
| & New Move | 0 0 0 0 1 0 0 0 0 0 0 0    Link | |
| for Lower X-Axis | 0 1 0 0 1 0 0 0 0 0 0 0    (0) | +18 |
| Add Upper Error & Link | 0 0 0 0 0 0 | |
| | 0 0 0 0 0 | |
| Add Upper New Move & X-Axis | 0 0 0 0 0 | |
| to Error Link Sum | 0 0 0 0 0 | |
| | 0 0 0 0 0 | |
| New Corrected Move | 0 1 0 0 1 0 0 0 0 0 0 0 / 0 0 0 0 0 | +18 |

Table C2

X-Axis (Negative Error)

| | | |
|---|---|---|
| Error | 0 1 1 1 1 1 1 1 1 1 1 1 : 1 1 1 1 1 | −2 |
| New Move | 0 0 0 0 1 0 0 0 0 0 0 0 : 0 0 0 0 0 | +16 |
| Add Error | 0 1 1 1 1 1 1 1 1 1 1 1    Link | |
| & New Move for | 0 0 0 0 1 0 0 0 0 0 0 0    (1) | |
| Lower X-Axis | 0 1 1 1 0 0 0 0 0 0 0 0 | +14 |
| Add Upper error & Link | 1 1 1 1 1 | |
| | 1 | |
| | 0 0 0 0 0 | |
| Add New Move Upper X-Axis to | 0 0 0 0 0 | |
| | 0 0 0 0 0 | |
| Error Link Sum | 0 0 0 0 0 | |
| New Corrected Move | 0 1 1 1 0 0 0 0 0 0 0 0 / 0 0 0 0 0 | +14 |

SUMMARY OF FEATURES

An important objective of the present invention has been to provide a computerized punching machine control for the average metalworking shop. The control system is capable of simultaneous computer-assisted piece-part programming and machine tool control, as well as additional highly significant functions. For example, absolute position readout devices such as 450, FIG. 4, may be connected to outputs such as the XM (complement) and XP (complement) outputs of FIG. 4 so as to provide absolute position information with respect to the X and Y axes at each successive tool location. This provides for the verification of the numerical contrl program tape and also for piece-part verification. The computer program may provide for the execution of any desired auxiliary functions such as a punch operation as represented in FIG. 9 and side gauge control as indicated in FIG. 11. Other desired operations such as tool change and the like can be handled as represented for the case of side gauge operation in FIG. 11. Thus, as illustrated in FIG. 13, in response to a command from punched tape, the computer may load a bit in its output register for delivery via conductor 130 to a flip-flop 1301 which when actuated serves to step a tool positioning device to a predetermined position. A suitable device selector 1302 is then actuated to set the flip-flop, and the flip-flop in its set condition enables the tool positioning drive until the same is reset by the tool associated with the flip-flop reaching the operating position.

Because of the low cost and great versatility of the system, it is particularly well suited for small job shops as well as in-plant metal fabrication departments. At present, metalworking shops are faced with the necessity of buying a machine tool, a numerical control, tape preparation equipment, and program and part verification equipment. Although machine-time, especially on short run production, is drastically reduced through the application of conventional numerical control, the relationship between real machine time and off-line tape preparation, verification and inspection time has remained disproportionate.

Some of the significant advantages of the present computer control system are as follows.

(1) The computer control is one complete unitized device. It eliminates the need for the usual off-line equipment. Immediately upon delivery, it is ready for use by average shop personnel (without special training).

(2) The computer control is inexpensive. When compared in cost and performance to the auxiliary equipment it replaces (i.e., tape preparation and verification equipment, machine controller and the usual part inspection equipment), the computer control is actually less costly. There is the further important fact of the additional flexibility of the versatile digital computer.

(3) The computer control is capable of performing two or more jobs at one time. Because of the built-in ability of the control to operate simultaneously, through time-sharing, the control can be operating a punching machine while a programmer is remotely and simultaneously putting data into the computer for generating another program.

(4) The control has dual EIA/ASCII capabilities. For example, data in ASCII code is entered into the control and automatically converted to EIA coded punched tape. Tapes prepared in either code can be read by the control and utilized to generate the digital command signals for the servo systems.

(5) Parts can be randomly programmed employing either incremental or absolute dimensions, or a combination of both. Both incremental and absolute data can be fed to the computer control. It will automatically convert any data input into the required machine format. The control automatically calculates and converts all position data into both incremental and absolute dimensions, and prints out a hard copy thereof as a program verification with each block separately identified.

(6) Data input from the computer console in generating numerical control programs results in enabling the programming operation to take place at least twice as fast as is done by any other commercially available tape preparation method. The flexibility of the digital type computer, combined with a simplified input, makes programming twice as fast. All repetitive or common operations are automatically programmed. Recognized errors are electronically corrected without repair or scrapping of tape, thus further saving time.

(7) The control improves machine speed and accuracy. A combination of control features allows for a greater range of acceleration, deceleration and unlimited overshoot, improving both machine speed and accuracy.

(8) The control can be programmed to assist in trouble shooting, and the computer itself is also equipped with a self-diagnostic program. Thus, the control automatically checks, isolates trouble spots and identifies them through print-outs at the console and thereby simplifies repair.

Basically, the control performs the function of a solid state digital computer and a solid state machine numerical control. It thus forms a "total capabilities" hole punching and notching system. Total responsibility for the "package", that is, installation, service, initial programming instruction and standard programs may rest with the supplier of the system. This relieves the user of the time-consuming, costly job of dealing with several unrelated suppliers.

The computer itself being a general purpose digital computer is resistant to technical obsolescence, and may be readily programmed to take advantage of new techniques and to perform new functions. In addition, the control offers the flexibility of being used either to operate multiple punching machines (each producing a different part) as illustrated in FIG. 12, or being used with additional tape preparation stations, all operating simultaneously, as is also illustrated in FIG. 12. The control can also be used to operate multiple punching machines and to service additional tape preparation stations at the same time, as is also illustrated in FIG. 12. An additional console and/or an additional servo system may be added to the system in the field as the need arises.

It will be apparent that many modifications and variations may be effected without departing from the scope of the novel concepts of the present invention.

EXCERPTS FROM OPERATION MANUAL

The following excerpts from the operation manual for a commercial computer control system in accordance with the present invention will assist in understanding the practical construction and operation of the invention. The subject matter of Section 1 is found in U.S. Pat. No. 3,634,662 beginning at column 26 and refers to a commercial system. In the portions of Section 2 which follow, reference numerals have been inserted referring to the drawings so that this section will serve also to summarize the operation of the illustrated embodiment. Section 2 is found in U.S. Pat. No. 3,634,662 beginning at column 36, and certain portions of Section 2 not pertinent to the illustrated embodiment have been omitted herein.

Section-2 SYSTEM SUMMARY

2.1 SUMMARY OF THE MODES OF OPERATION OF THE MACHINE TOOL CONTROL

Automatic Mode

In the automatic mode of operation, numerical control tape is read from the high speed tape reader 600, FIG. 6, into the digital computer 603; the computer then loads a corresponding binary number into the position control logic of interface 628. The control logic then controls positioning of the machine tool to the coordinate represented by the binary number. Upon positioning to a given coordinate, a command is given to the computer by means of relays 181 and 1107, FIG. 11, signifying an in-position condition. If all other conditions are favorable, the machine tool will then be allowed to perform it's job, whether it be to drill, punch, etc., and at this time another block of tape is read from the high speed reader. Due to the fact that a high speed tape reader is used, a block of information can be read and ready for use before a machine function can be completed. Machine tool operation will continue in this fashion until a tool change or machine stop is indicated by the piece part punched tape program.

Step Mode

In the step mode of operation, the computer control reads one block of information, executes the move and inhibits the machine function and waits for a command to proceed with the next move. Subsequent moves are executed individually by the machine tool operator giving appropriate signals to the computer. This mode of operation can be used by the machine tool operator to verify the positioning of machine tools without producing a piece part.

Type Mode

The type mode allows positioning coordinates to be entered to a computer control via the typewriter at the console. Upon receiving a proper command the machine tool will accurately position to a specified coordinate. This mode is extremely valuable in that it allows an accurate positioning means of manually entered data.

Manual Mode

The manual mode permits a machine tool operator to manually position a machine tool anywhere within the allowable limits of travel.

2.2 SUMMARY OF COMPUTER OPERATION

Since more than one simultaneous job is required of the computer, the computer must have the capability to operate on a time-sharing principle. It must be capable of decoding an interrupt request received from external hardware and appropriately going to various positions of the stored computer program to perform different tasks.

At the present time, approximately $\frac{1}{4}$ of a 4096 12 bit word computer memory is used to control a single two axes punching machine tool. The other $\frac{3}{4}$'s of the memory is used to assist a piece part programmer in numerical tape preparation.

The present computer control employs a machine tool system clock which interrupts the computer at a rate of 60 times a second. The computer, upon receiving this interrupt, checks the status of the machine tool to determine if the status of the machine tool has changed since the last sampling period. If the status has changed, the computer takes appropriate action.

Program Interrupt

When an input/output device is in need of service from the digital computer, it signifies the need through a status flag. A status flag is nothing more than a flip-flop connected to the interrupt bus of the computer. Upon receiving an interrupt, the computer completes the instruction which it may be processing and then stores the location of the next instruction so it may return after servicing the interrupt; the computer then enters an interrupt service routine, whereby it would check status flags on a previously determined priority basis in order to identify the input/output device requiring service. It may also be noted, more than one computer program can exist in the computer memory simultaneously, and any one or all can be running separately or concurrently.

2.3 SUMMARY OF POSITION CONTROL LOGIC

The purpose of the position control logic is to accept binary coordinate information from the computer and to position the machine tool to that specified coordinate. FIG. 6 shows a block diagram of a two axes position control logic scheme.

In an operating condition the computer reads X and Y binary coded decimal coordinate information from the high speed tape reader 600 and converts this data into 2's complement binary. This information is then loaded into external up/down binary counters such as illustrated in FIG. 1. At this point the desired incremental move is stored and the computer is free to process other information from other input/output devices.

The numbers stored in the external up/down binary counters are monitored by digital to analog converters such as 105-107, FIG. 1A, to produce DC voltages proportional to the digital count. The analog output voltage is then applied to servo amplifiers such as 109, FIG. 1B, which in turn drive the X and Y axes motors.

Position feedback is obtained from digital transducers such as indicated at 112, FIG. 1B, mounted on the axes leadscrews. The transducer pulses are decoded to determine direction of travel and applied to pulse synchronizing networks such as indicated at 117, FIG. 1B. If the computer is not sampling or loading the external counters, the transducer pulses are transmitted to count down the incremental position coordinate stored in the up/down counters.

Thus, positioning continues in this fashion with the computer periodically checking machine tool status until the machine tool has completed the specified incremental move.

As the machine tool is approaching the desired position, an in-position detector such as indicated at 110, FIG. 1B, monitors the external binary up/down counters to determine when the remaining count is an acceptable distance away from desired position. The in-position detector has a variable bandwidth and is directly related to over-all positioning time. As an example, a large in-position deadband permits faster point to point positioning times.

Upon receiving an in-position signal the computer checks the status of the machine tool and if all other conditions are favorable, the machine tool is permitted to punch, drill, etc., depending on the specific machine tool.

At the same time, the digital computer will read the external counters to determine the positioning error; this error, if any, is normally small, its size being determined by the adjustment of the in-position detector. The computer, having read this error, then proceeds to appropriately compensate the next move already decoded from the high speed tape reader. As an example, if the machine tool's next move was in the same direction as a previous move with an overshoot error, the computer would subtract the amount of overshoot error from the next move, thereby compensating every move individually.

2.4 SUMMARY OF OVERALL PIECE PART FABRICATION

Part Verification

The computer control can be equipped with two methods of part verification. The first method involves the use of absolute value display counters such as 450, FIG. 4. These absolute value display counters can be reset at the reference point of the piece part, then the machine tool operator may stop the piece part at any point in a particular job and examine the schematic diagram against the value displayed in the counters to verify positioning accuracy. The second method of part verification involves using a standard machine tool control program. This control program will allow the machine to punch any given part at its maximum speed, while at the same time the console typewriter attached to the computer control will be printing out as fast as it can the positioning error for X and Y for each move on the piece part. Thus, when the piece part is finished and the typewriter has stopped printing, the machine operator will have a finished part and written record of the positioning accuracy of the machine tool.

2.5 SUMMARY OF PIECE PART PRODUCTION

Machine Tool Control (Method of Operation)

When a machine tool operator is ready to use the machine tool, he indicates his readiness to the computer through the machine tool control panel, If in the automatic mode, the digital computer issues a command to the tape reader 600, FIG. 6 and reads a data block of information. Included in the data block of information. Included in the data block of information are auxiliary functions along with coordinate information. The format of the punched tape may be fixed sequential block or word address according to EIA machine tool standards. The computer interprets the data block, issues commands to auxiliary input/output devices turning on lights and activating relays, etc., and executes the move through the position control logic.

Unlimited Overshoot

The computer control system can recover from unlimited overshoot unlike other numerical controls which can tolerate only a limited amount of overshoot. This feature permits the computer control to position machine tools from point to point faster since higher starting forces may be used. The computer, having this overshoot capability, allows a larger initial force to be applied to the carriage, resulting in controllable overshoot and faster positioning for very near coordinates, and smaller traveling time for far away coordinates.

Variable Speed and Accuracy

The speed and accuracy obtained in controlling machine tools with a computer control are variable and directly proportional to each other. For example, a larger setting of the in-position detector results in faster positioning times. A typical range of accuracy settings for a computer control would be from 0.005 to 0.064 inch.

2.6 SUMMARY OF OPTIONAL FEATURES

Capabilities Without Memory Extension

Additional Tape Preparation Assistance

Due to the extreme flexibility of the digital computer, many changes and variations in the previously described formats can be accomplished. For example, the tape preparation station can be programmed to permit preparation of numerically punched tape for other type machine tools. Also, further software refinements can be added to facilitate preparation of piece part programs. Examples of these would be as follows: (1) Pattern Repetition. Pattern repetition would be the ability to duplicate a regular or irregular pattern to some other location on the work piece. (2) Pattern Generation. Pattern generation would be the ability to generate regular patterns given some starting information. Uses would include squares, equilateral triangle, circles. (3) Scaling. Scaling would allow repetition of a pattern with an increase or decrease in magnitude between hole coordinates.

Multiple Machine Control

Due to the flexibility of the computer to service many input/output devices and the manner in which the positioning loop is closed outside the computer, more than one machine tool may be controlled by the computer as illustrated in FIG. 12, for example. Depending upon the number and type of machine tools, different methods of control are possible. For instance, if more than one machine tool of the same make are used, it is possible to share some portions of the control. In the case if dissimilar machine tools, individual tape readers, servo systems and position control logic will be necessary in controlling these machine tools. However, the incremental cost for these items is expected to be less than the price of an individual numerical control. The number of different types of machine tools that can be controlled by the computer control depends on a large number of variables.

The complexity of the machine tool, the amount of memory available and the method of approach all are factors in determining the number and speed of servicing these machine tools. The present computer control can tolerate 64 input/output devices. Input/output devices are things such as tape readers, console typewriter, machine tools, position control logic.

When a customer purchases a computer control with the console typewriter and one machine tool, it is very similar to purchasing an electronic switchboard and two extension telephones. If more machine tools are to be controlled, it is very similar to purchasing more extension telephones. If the switchboard becomes overloaded because too many extension telephones are trying to use it at the same time, a busy signal will be given and the telephones will be services as others are made free. Likewise, the computer control operates on an interrupt system wherein, if more than one machine tool would come into position at the same time, they would be serviced based on a previously determined priority.

Other Computer Uses

Since the computer control is capable of operating in a time-sharing mode it can control a machine tool and at the same time be used to solve engineering, accounting, inventory or other customer specified tasks. Due to the limited amount of memory available using a small digital computer, all these features could not be stored in memory concurrently; however, being software they could be constantly available in the form of previously prepared tape. The amount of time necessary to use these features is only a matter of minutes using the high speed tape reader.

Maintenance & Troubleshooting

Computer control maintenance is minimized by the use of reliable solid-state, plug-in components.

Should a malfunction occur within the computer or the logic circuitry, the computer may be equipped with diagnostic programs to assist in pinpointing the problem.

Capabilities with Memory Extension

Additional extended memory would allow the user concurrent operation of the specific features previously discussed. Other features could be provided such as: (1) optimum positioning path selection, (2) automatic tool changer, (3) adaptive speed control, (4) control of more sophisticated machine tools, and (5) further tape preparation aids.

2.7 SUMMARY OF COMPUTER CONTROL FEATURES

The most important feature of the computer control is again its flexibility and resistance to technical obsolescence. Because of this flexibility, it is able to simultaneously control machine tools and prepare numerical punched tape. The computer control can control multiple machine tools at an incremental cost less than standard numerical controls, and the time to prepare punched tape has been drastically reduced, reducing the time to complete production of piece parts. The computer control also provides for continuous program and piece part verification while allowing input of piece part data in a simplified format. Dual EIA/ASCII capabilities are available and the programmer has the option to program coordinates in either incremental and/or absolute dimensions.

Finally, all repetitive or common operations are automatically programmed, errors are electronically corrected, and the machine tool positioning time has been significantly decreased.

ALTERNATIVE EMBODIMENT

The following is taken from my U.S. Pat. No. 3,689,821 beginning at column 13.

The aforementioned application Ser. No. 652,968 filed July 12, 1967 teaches that the program control circuits component may comprise a general purpose digital computer. In this case, the computer itself may be programmed to compensate for a specific mechanical error pattern. The major benefit of this embodiment is that no additional hardware is required. All corrections are made to the data after they have been read from punched tape or the like, but before they are loaded into the up-down error register.

The basic principles upon which this method is based are the following.

1. The machine tool must be calibrated along some correction increment, the choice of which is arbitrary.
2. An increment designation number should then be assigned to every correction increment.
3. The computer then stores this table of information including increment designation numbers, absolute value of correction increments, correction increment size and the correction values.
4. As new moves are read into the computer, the computer checks the table to see whether any correction is necessary and, if so, it determines how much from the previously stored table. The computer then makes the correction before loading the data coordinates into the position control loop including the error register.

The following Table A is an example of the type of table which would be stored in the computer.

TABLE A

| Increment Designation Number | Absolute Value of Correction Increment | Correction Increment Size | Correction |
|---|---|---|---|
| 0 | 0 | 0 | 0 |
| 1 | 10 | 10 | +1 |
| 2 | 20 | 20 | −1 |
| 3 | 21 | 1 | 0 |
| 4 | 22 | 1 | 0 |
| 5 | 23 | 1 | +1 |
| 6 | 24 | 1 | 0 |
| 7 | 25 | 1 | 0 |
| 8 | 26 | 1 | +1 |
| 9 | 27 | 1 | 0 |
| 10 | 28 | 1 | 0 |
| 11 | 29 | 1 | +1 |
| 12 | 30 | 1 | 0 |
| 13 | 40 | 10 | −2 |
| 14 | 50 | 10 | 0 |

A flow chart illustrating the sequence of operation would then be as follows:

Mechanical Error Compensation Flow Chart

| | |
|---|---|
| (a) | $P_1 = P_2 = 0$ |
| (b) | Read new incremental move. |
| (c) | Determine number of correction increments transversed. This is accomplished by additively comparing adjoining correcton increments in the proper direction with the size of the new incremental move. |
| (d) | Set pointer $P_2$ to the increment designation number representing the number of correction increments transversed. |
| (e) | Add signed corrections between pointers $P_1$ and $P_2$. |
| (f) | Appropriately compensate the incremental move by adding or subtracting counts. |
| (g) | Set $P_1 = P_2$ |
| (h) | Use compensated move as incremental positioning coordinate. |
| (i) | Return to (b) |

An example in accordance with the flow chart is as follows:

EXAMPLE:

| | |
|---|---|
| Step 1- | $P_1 = P_2 = 0$ |
| Step 2- | New Move = +30.000 Increment |

| Step 3- | Is New move | ≧ | Designation | Answer |
|---|---|---|---|---|
| | 30 | | 1 | Yes |
| | 30 | | 2 | Yes |
| | 30 | | 3 | Yes |
| | 30 | | 4 | Yes |
| | 30 | | 5 | Yes |
| | 30 | | 6 | Yes |
| | 30 | | 7 | Yes |
| | 30 | | 8 | Yes |
| | 30 | | 9 | Yes |
| | 30 | | 10 | Yes |
| | 30 | | 11 | Yes |
| | 30 | | 12 | Yes |
| | 30 | | 13 | No |

Number of correction increments transversed is 12.

| | |
|---|---|
| Step 4- | $P_2 = 12$ |
| Step 5- | + 1 − 1 + 1 + 1 + 1 = + 3 |
| Step 6- | Compensated New Move = + 30.003 |
| Step 7- | $P_1 = P_2 = 12$ |
| Step 8- | New Move = − 5.000 |

| Step 9- | Is new Move | ≧ | Increment Designation | Answer |
|---|---|---|---|---|
| | 5 | | 12 | Yes |
| | 5 | | 11 | Yes |
| | 5 | | 10 | Yes |
| | 5 | | 9 | Yes |
| | 5 | | 8 | Yes |
| | 5 | | 7 | No |

Number of Correction increments transversed is 5.

| | |
|---|---|
| Step 10- | $P_2 = 8$ |
| Step 11- | + 1 + 1 = + 2 |

Definition of the Term "Minicomputer"

The following definition of "minicomputer" is taken from page 950 of the McGraw-Hill Dictionary of Scientific and Technical Terms, 1974, (the abbreviation ADP indicating that the definition applies to the field of automatic data processing):

"minicomputer [ADP] A small computer which in its basic configuration has at least 4096 words of memory, employs words between 8 and 16 bits in length."

SUMMARY

The illustrated subject matter includes a motion counter circuit such as XL11-XL5, FIG. 1A and XLO, SU11-XUO, FIG. 1B. The counter circuit receives feedback pulses generated as a function of movement of a part of a machine tool via the line X-Clock 119 shown at the left in FIG. 1A and shown at the right at 199 in FIG. 4. The synchronizer circuitry of FIG. 4 is represented by block 117 at the lower right of FIG. 1B, and it will be noted from FIGS. 1B and 4 that the synchronizer 117 is interposed between the feedback transducer system including X-axis transducer 112, FIG. 1B and FIG. 4 and the X clock line 199 shown as the lower output at the left of synchronizer 117 in FIG. 1B. The Hold X component 115 shown at the right in FIG. 1B as controlling synchronizer 117 is also shown at the upper right in FIG. 4.

As explained in the section entitled "Operation of FIG. 6" as soon as both axes remain in the vicinity of the required end point for the required time, the detector components such as X-axis will detector 110, FIG. 1B, signal the computer, for example via channel 627, machine positioning interface component 628 and channel 629. Other operations of the computer 603 may thus be interrupted by means of a program interrupt signal from interface 628, at which time the computer will energize the axis hold component such as 115, FIG. 1B, and read the contents of the associated counter chain.

The two-way information transmission circuitry as generally represented in FIG. 6 may include the detailed connections shown in FIGS. 2 and 3, for example, where as shown at the left in FIG. 2 the output bus drivers component 201 of the computer output circuits 200 has a cable 130 leading to individual conductors such as 221-232 and 241-245 which are also shown in FIGS. 1A and 1B as leading to the counter circuit XL, XU as previously described. As also shown in FIGS. 1A and 1B, the outputs from the stages of the motion counter circuit are conducted by means of conductors 185-191 in FIG. 1A and 192-195, FIG. 1B to the gates 104 and 108 which also appear at the left in FIG. 3. All of these counter information transmission lines of the two-way information transmission circuitry connect with a cable 197 indicated at the right in FIG. 3 as returning to the computer accumulator. Thus, the two-way information transmission circuitry connecting the counter circuit on line with the stored program digital computer include the cable 130 shown in FIG. 2 and the cable 197 shown in FIG. 3.

It is considered that the term "minicomputer" is properly supported by the "small scale" computer description found at page 83, the second line of text of DEC-B, cited at column 4, lines 53 and 54 of U.S. Pat. No. 3,634,662, namely *The Digital Small Computer Handbook* published by Digital Equipment Corporation, 1967 edition (494 pages).

The operation of the circuitry of FIG. 4 with respect to the two-way information transmission circuitry will be understood from the section entitled "Operation of FIGS. 1A and 1B", for example the last three paragraphs thereof (beginning at the middle of application page 15) thus, actuation of the Hold X component 115 shown at the right in FIG. 1B and at the upper right in FIG. 4 causes synchronizer 117 to interrupt the supply of X clock pulses for a sufficient interval to insure that the counting stages may be inspected by the computer. The "Hold" interval is related to the duration of the readout operation by the computer but is sufficiently short, so that any feedback pulse from transducer 112 that might occur during the readout operation would only be blocked for a portion of its duration. Thus, transitions of the count value in the counter circuit of FIGS. 1A and 1B are prevented during the readout operation.

The two-way information transmission circuitry between the pulse counter means such as XL and XU of FIGS. 1A and 1B, and the stored program digital computer circuit means 603, FIG. 6, includes not only the twelve-conductor computer bus system 130 as shown in FIG. 2 and 197 as shown in FIG. 3, but further includes, for example, the components 105-107, FIG. 1A, and 109, 110, FIG. 1B, which couple the pulse counter means when in a null condition with the computer 603, FIG. 11, by means of relay contacts 182 of relay 181 of component 110, and move flip-flop 1114, FIG. 11. The move flip-flop condition is sensed by computer 603 via the conductor indicated at 1122 at the right in FIG. 11. Once the move complete or reset condition of the move flip-flop 1114 has served its purpose, the two-way information transmission circuitry provides for on line coupling of the digital computer circuit means 603 with the machine tool control via conductor BAC4 of computer bus 130, FIG. 11, so as to set the move flip-flop 1114, FIG. 11, from the computer in conjunction with selector 1109, FIG. 11 and thus to condition for control for executing a further machine tool movement. The two-way information transmission circuitry, each time a further move is completed, again provides for on-line coupling of the pulse counter means such as XL, XU, FIGS. 1A and 1B, with the digital computer circuit means 603, FIG. 11, so that the digital computer can sense the completion of each further machine tool movement as signalled by the null condition of the pulse counter means and the corresponding actuation of the relays 181 and 1107, FIG. 11. Specifically the computer senses the move complete or reset condition of the move flip-flop 1114 by actuating read selector 1111, FIG. 11, which is associated with gate 1105 and conductor 1122, FIG. 11.

I claim as my invention:

1. A unitized machine tool control system for a single machine tool, operable both for generating new machine tool control instructions for the machine tool and for controlling movement of parts of the machine tool relative to respective machine tool axes in accordane with a previously established sequence of machine tool control instructions, said utilized machine tool control system comprising:
    (a) manually controlled input means operable to produce coded input signals as manually selected by an operator,
    (b) source means for supplying successive machine tool control instructions of a previously established sequence,
    (c) stored program digital computer means operable to receive said coded input signals and said previously established sequence of machine tool control instructions, including computer memory means providing for the storage therein and retrieval therefrom of machine tool control instructions, and computer output means, and said stored program digital computer means being operable in a first mode to transmit to said computer memory means machine tool control instructions in accordance with coded input signals from said manually controlled input means and being operable in a second mode to transmit to said computer memory means machine tool instructions in accordance with a previously established sequence supplied from said source means and being operable in a third mode to transmit to said computer output means digital command signals in accordance with a previously established sequence of machine tool control instructions,
    (d) plural axis closed loop machine tool control means operatively connectable to the respective parts of the machine tool and responsive to said digital command signals to control movements of the parts of the machine tool relative to the respective machine tool axes in accordance therewith, and
    (e) on-line connection means interconnecting said manually controlled input means, said source means and said stored program digital computer means and including multiconductor computer bus cable means extending from said computer output means of said stored program digital computer means to said closed loop machine tool control means for interconnecting said stored program digital computer means and said plural axis closed loop machine tool control means, thereby to form one complete unitized device providing for on-line manual generation of machine tool control instructions, on-line editing of a previously established sequence of machine tool control instructions, and on-line operation of the machine tool in accordance with a previously established sequence of machine tool control instructions.

2. A unitized machine tool control system for a single machine tool, operable for generating new machine tool control instructions for the machine tool and for controlling movement of parts of the machine tool relative to respective machine tool axes in accordance with a previously established sequence of machine tool control instructions so as to verify such previously established sequence, said unitized machine tool control system comprising:

(a) manually controlled input means operable to produce manually generated machine tool control instructions as manually selected by an operator, (b) source means for supplying successive machine tool control instructions of a previously established sequence, (c) stored program digital computer means operable to receive said manually generated machine tool control instructions and said previously established sequence of machine tool control instructions, and including computer memory means providing for the storage therein and retrieval therefrom of machine tool control instructions, said stored program digital computer means being operable in a first mode to transmit to said computer memory means machine tool control instructions from said manually controlled input means, being operable in a second mode to transmit to said computer memory means machine tool instructions in accordance with a previously established sequence supplied from said source means, and being operable in a third mode to supply output digital command signals in accordance with a previously established sequence of machine tool control instructions, (d) plural axis closed loop machine tool control means operatively connectable to the respective parts of the machine tool and responsive to said digital command signals to control movements of the parts of the machine tool relative to the respective machine tool axes in accordance therewith, and including absolute position counter means for maintaining a count in accordance with the absolute position of the respective parts of the machine tool relative to the respective machine tool axes during successive movements of the parts and operable for providing a visual readout for verification of a sequence of machine tool control instructions as executed by the machine tool control means, (e) on-line connection means interconnecting said manually controlled input means, said source means, said stored program digital computer means and said closed loop machine tool control means, thereby to form one complete unitized device providing for on-line manual generation of machine tool control instructions and on-line editing of a previously established sequence of machine tool control instructions, and on-line operation of the machine tool in accordance with a previously established sequence of machine tool control instructions to verify such sequence of machine tool control instructions at the machine tool.

3. A unitized machine tool control system for a single machine tool and operable both for producing new coded records for the machine tool and for controlling movement of parts of the machine tool relative to respective machine tool axes, said unitized machine tool control system comprising:

(a) coded record means operable in an input mode for supplying successive machine tool control instructions of a previously establshed sequence and operable in an output mode for producing a sequence of machine tool control instructions on a coded record, (b) manually controlled input means operable to produce manually generated coded editing instructions as manually selected by an operator, (c) stored program digital computer means operable in a first mode to store successive machine tool control instructions of a previously established sequence, operable in a second mode to modify the stored machine tool control instructions in accordance with manually generated coded editing instructions to produce a new sequence of machine tool control instructions, operable in a third mode for supplying as an output a sequence of successive machine tool instructions as stored thereby, and operable in a fourth mode for generating digital command signals in accordance with machine tool control instructions of a previously established sequence, (d) plural axis closed loop machine tool control means operatively connectable to the respective parts of the machine tool and responsive to said digital command signals to control movements of the parts of the machine tool relative to the respective machine tool axes in accordance therewith, and (e) on-line connection means interconnecting said coded record means and said manually controlled input means with said stored program digital computer means for the transmission of successive machine tool control instructions of a previously established sequence from the coded record means to said digital computer means, for transmitting a sequence of successive machine tool control instructions from the digital computer means to said coded record means for producing a coded record in accordance therewith, and for the transmission of coded editing instructions from the input means to the digital computer means, and interconnecting said stored program digital computer means and said closed loop machine tool control means for supplying digital command signals in accordance with machine tool control instructions of a previously established sequence from the digital computer means to said closed loop machine tool control means.

4. In a machine tool control system for generating digital command signals and for controlling movement of parts of a machine tool relative to respective machine tool axes in accordance therewith, (a) manually controlled input means operable to produce manually selected machine tool control instructions as manually selected by an operator, (b) coded record means operable for supplying successive machine tool control instructions of a previously established sequence, (c) stored program digital computer means including computer memory means and computer output means, and said computer memory means being operable in a coded record preparation mode to store manually selected machine tool control instructions and said previously established sequence of machine tool control instructions, and said stored program digital computer means being operable in a machine tool operating mode to transmit to said computer output means digital command signals in accordance with manually selected machine tool control instructions from said manually controlled input means and in accordance with a sequence of machine tool control instructions from the coded record means, (d) plural axis closed loop machine tool control means operatively connectable to the respective parts of the machine tool and responsive to said digital command signals to control movements of the parts of the machine tool relative to the respective machine tool axes in accordance therewith, and (e) on-line connection means interconnecting said manually controlled input means, said coded record means and said stored program digital computer means and including multiconductor computer bus cable means for transmitting said digital command signals and extending from said computer output means of said stored program digital computer means to said closed loop machine tool control means for interconnecting said stored program digital computer means and said plural axis closed loop machine tool control mans, thereby to form one complete unitized device providing for on-line manual generation of machine tool control instructions and on-line modification of a previously established sequence of machine tool control instructions, and on-line operation of the machine tool selectively from said manually controlled input means and from said coded record means.

5. A unitized machine tool control system for a single machine tool, operable both for generating a new sequence of machine tool control instructions for the machine tool and for controlling movement of parts of the machine tool relative to respective machine tool axes to verify a previously established sequence of machine tool control instructions, said unitized machine tool control system comprising:

(a) manually controlled input means operable to produce manually selected machine tool control instructions as manually selected by an operator, (b) source means operable in an automatic mode for supplying successive machine tool control instructions of a previously established sequence, and operable in a step mode to supply a single machine tool control instruction of a previously established sequence with manual control of the supply of each successive machine tool control instruction, (c) stored program digital computer means operable to receive said manually selected machine tool control instructions and said previously established sequence of machine tool control instructions, and including computer memory means providing for the storage therein and retrieval therefrom of machine tool control instructions, said stored program digital computer means being operable in a first mode to transmit to said computer memory means for storage therein machine tool control instructions in accordance with said manually selected machine tool control instructions from said manually controlled input means and being operable in a second mode to transmit to said computer memory means for storage therein machine tool instructions in accordance with a previously established sequence supplied from said source means and being operable in a third mode to supply as an output therefrom digital command signals in accordance with a previously established sequence of machine tool control instructions, (d) plural axis closed loop machine tool control means operatively connectable to the respective parts of the machine tool and responsive to said digital command signals to control movements of the parts of the machine tool relative to the respective machine tool axes in accordance therewith, and (e) on-line connection means interconnecting said manually controlled input means, said source means, said stored program digital computer means and said closed loop machine tool control means thereby to form one complete unitized device and providing for the transmission of said manually selected machine tool control instructions from said manually controlled input means to said digital computer means, for the transmission of successive machine tool control instructions from the source means to the digital computer means, and for the transmission of said digital command signals from said digital computer means to said machine tool control means, for on-line manual generation of machine tool control instructions in said first mode and for on-line editing of a previously established sequence of machine tool control instructions in said second mode, and for on-line operation of the machine tool in accordance with a previously established sequence of machine tool control instructions in said third mode with on-line verification at the machine tool of each successive machine tool control instruction of a previously established sequence in the step mode of said source means.

6. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce manually selected machine tool control instructions as manually selected by an operator, (b) source means for supplying successive machine tool control instructions of a previously established sequence, (c) stored program digital computer means operable to receive said manually selected machine tool control instructions and said previously established sequence of machine tool control instructions, and including computer memory means providing for the storage therein and retrieval therefrom of machine tool control instructions, and computer output means, said stored program digital computer means being operable in a first mode to transmit to said computer memory means machine tool control instructions in accordance with manually selected machine tool control instructions from said manually controlled input means and being operable in a second mode to transmit to said computer output means digital command signals in accordance with a previously established sequence of machine tool control instructions from said source means, (d) plural axis closed loop machine tool control means operatively connectable to the respective parts of the machine tool and responsive to said digital command signals to control movements of the parts of the machine tool relative to the respective machine tool axes in accordance therewith, and (e) on-line connection means interconnecting said manually controlled input means, said source means and said stored program digital computer means for transmitting said machine tool control instructions, including multiconductor computer bus cable means for transmitting said digital command signals and extending from said computer output means of said stored program digital computer means to said closed loop machine tool control means, thereby to form one complete unitized device providing for on-line manual generation of machine tool control instructions, and on-line operation of the machine tool in accordance with a previously established sequence of machine tool control instructions.

7. A computerized machine tool control system for unitized computer-assisted piece part programming and machine tool control, comprising:

(a) manually controlled input means operable to produce manually selected machine tool control instructions as manually selected by an operator, (b) source means for supplying successive machine tool control instructions of a previously established sequence, (c) stored program digital computer means operable to receive said manually selected machine tool control instructions and said previously established sequence of machine tool control instructions, and including computer memory means providing for the storage therein and retrieval therefrom of said machine tool control instructions, said stored program digital computer means being operable in a first mode to transmit to said computer memory means for storage therein machine tool instructions in accordance with said manually selected machine tool control instructions supplied from said manually controlled input means and in accordance wth a previously established sequence of machine tool control instructions supplied from said source means, and being operable in a second mode to supply as an output therefrom in accordance with a previously established sequence of machine tool control instructions, displacement type command signals and auxiliary command signals for effecting respectively desired movements of the parts of the machine tool relative to the respective machine tool axes and the execution by the machine tool of an auxiliary machine tool function, (d) plural axis closed loop machine tool control means operatively connectable to the respective parts of the machine tool and responsive to said displacement type command signals to control movements of the parts of the machine tool relative to the respective machine tool axes in accordance therewith, and including auxiliary machine tool function circuit means actuatable for causing the machine tool to execute an auxiliary machine tool function, (e) auxiliary function selector means connected with said auxiliary machine tool function circuit means and responsive to auxiliary command signals to actuate said auxiliary machine tool function circuit means, (f) manually operated switch means manually operable by the machine tool operator, having a manual mode condition, and including auxiliary function switch means connected with said auxiliary machine tool function circuit means and manually actuatable in the manual mode condition to actuate said auxiliary machie tool function circuit means, and (g) on-line connection means interconnecting said manually controlled input means, said source means, said stored program digital computer means, said closed loop machine tool control means and said auxiliary function selector means thereby to form one complete unitized device and providing for the transmission of said machine tool control instructions from said input means and said source means to said digita computer means, and for the transmission of said displacement type command signals and said auxiliary command signals from said digital computer means to said machine tool control means and to said auxiliary function selector means, respectively.

8. A machine tool control system for a single machine tool, providing unitized computer-assisted piece part programming and machine tool control, said machine tool control system comprising:

(a) manually controlled input means operable to produce coded input signals as manually selected by an operator, (b) source means for supplying successive blocks of machine tool control instructions of a previously established sequence, (c) stored program digital computer means operable to receive said coded input signals and said blocks of machine tool control instructions and including computer memory means providing for the storage therein and retrieval therefrom of individual blocks of machine tool control instructions of a stored sequence of such blocks, and computer output means for transmitting digital command words having a predetermined number of bit positions, and said stored program digital computer means being operable in a first mode to transmit to said computer memory means blocks of machine tool control instructions in accordance with coded input signals from said manually controlled input means and being operable in a second mode to transmit to said computer memory means blocks of machine tool instructions in accordance with a previously established sequence supplied from said source means and being operable in a third mode to transmit to said computer output means digital command words together corresponding to a block of machine tool control instructions of a previously established sequence, (d) plural axis closed loop machine tool control means operatively connectable to the respective parts of the machine tool, having respective sections of gates for transmitting the respective digital command words together corresponding to a block of machine tool control instructions, respective axis register means each having respective register sections connected with respective sections of said gates, and gate selector means for controlling said sections of gates and operable to activate the sections of gates to load each digital command word into a respective register section in parallel, but to load the respective register sections of a respective axis register means in sequence, and said machine tool control means being responsive to said digital command words corresponding to a block of machine tool control instructions to control movements of the parts of the machine tool relative to the respective machine tool axes in accordance therewith, and (e) on-line connection means interconnecting said manually controlled input means, said source means and said stored program digital computer means and including multiconductor computer bus cable means having numbers of conductors for transmitting each digital command word in parallel and extending from said computer output means of said stored program digital computer means to said sections of gates of said closed loop machine tool control means for interconnecting said stored program digital computer means and said respective axis register means of said plural axis closed loop machine tool control means, thereby to form one complete unitized device providing for on-line manual generation of blocks of machine tool control instructions, on-line editing of individual blocks of a stored sequence of blocks of machine tool control instructions, and on-line operation of the machine tool in accordance with a previously established sequence of blocks of machine tool control instructions.

9. A machine tool control system operable both for generating new machine tool control instructions for a machine tool and for controlling movement of parts of the machine tool relative to respective machine tool axes in accordance with a previously established sequence of machine tool control instructions so as to verify such previously established sequence at the machine tool, said machine tool control system comprising:

(a) manually controlled input means operable to produce manually generated incremental machine tool control instructions as manually selected by an operator, (b) source means for supplying successive blocks of incremental machine tool control instructions of a previously established sequence, (c) stored program digital computer means operable to receive said manually generated incremental machine tool control instructions and said successive blocks of incremental machine tool control instructions of a previously established sequence, and including computer memory means providing for the storage therein and retrieval therefrom of any individual block of machine tool control instructions, said stored program digital computer means being operable in a first mode to transmit to said computer memory means for storage individual blocks of machine tool control instructions in accordance with said manually generated incremental machine tool control instructions from said manually controlled input means, being operable in a second mode to transmit to said computer memory means for storage successive individual blocks of incremental machine tool instructions in accordance with a previously established sequence supplied from said source means, and being operable in a third mode to supply output digital command words in accordance with each block of a previously established sequence of blocks of incremental machine tool control instructions, (d) plural axis closed loop machine tool control means operatively connectable to the respective parts of the machine tool and each being responsive to a plurality of said digital command words assembled into an incremental axis command therein to control an incremental movement of a respective corresponding part of the machine tool relative to the respective machine tool axis, and including respective absolute position counter means for maintaining respective counts in accordance with the absolute position of the respective parts of the machine tool relative to the respective machine tool axes during execution of each successive block of the previously established sequence of blocks of incremental machine tool control instructions, and operable for providing a visual readout for verification of the sequence of blocks of incremental machine tool control instructions as executed by the machine tool control means, and (e) on-line connection means interconnecting said manually controlled input means, said source means, said stored program digital computer means and said closed loop machine tool control means, thereby to form one complete unitized device and comprising computer input bus cable means extending from said manually controlled input means and said source means to said digital computer means for transmitting said manually generated incremental machine tool control instructions and said successive blocks of incremental machine tool control instructions to said digital computer means, and comprising multiconductor computer output bus means extending from said digital computer means to said machine tool control means for transmitting each digital command word in parallel and for supplying the digital command words in accordance with each block of the previously established sequence of blocks of incremental machine tool control instructions to the machine tool control means.

10. A unitized machine tool control system operable both for producing new coded records for a machine tool and for controlling movement of parts of the machine tool relative to respective machine tool axes, said unitized machine tool control system comprising:

(a) coded record means operable in an input mode for supplying successive blocks of machine tool control instructions of a previously established sequence and operable in an output mode for producing a sequence of blocks of machine tool control instructions on a coded record, (b) manually controlled input means operable to produce manually generated coded editing instructions as manually selected by an operator, (c) stored program digital computer means including random access computer memory, memory means for storing at respective identified locations respective blocks of machine tool control instructions, and operable in a first mode to store successive blocks of machine tool control instructions of a previously established sequence at successive identified locations of said computer memory means, and operable in a second mode to respond to respective different manually generated coded editing instructions as identifying respective ones of said locations of said computer memory means and to produce a new sequence of blocks of machine tool control instructions based on the previously established sequence stored in said computer memory means, operable in a third mode for supplying as an output a sequence of blocks of machine tool instructions as stored in said computer memory means, and operable in a fourth mode for generating digital command signals in accordance with successive blocks of machine tool control instructions of a previously established sequence,
  (d) plural axis closed loop machine tool control means operatively connectable to the respective parts of the machine tool and responsive to said digital command signals to execute a block of the machine tool control instructions in one move of the parts relative to the respective machine tool axes in accordance therewith, and
  (e) on-line computer bus means interconnecting said coded record means and said manually controlled input means with said stored program digital computer means for the on-line transmission of successive blocks of machine tool control instructions of a previously established sequence from the coded record means to said digital computer means, for transmitting on-line a sequence of successive blocks of machine tool control instructions from the digital computer means to said coded record means for producing a coded record in accordance therewith, and for the on-line transmission of coded editing instructions from the input means to the digital computer means, and interconnecting said stored program digital computer means and said closed loop machine tool control means for the on-line supply of digital command signals in accordance with a block of machine tool control instructions of a previously established sequence from the digital computer means to said closed loop machine tool control means.

11. A machine tool control system for a single machine tool, operable for generating digital command signals and for controlling movement of parts of a machine tool relative to respective machine tool axes in accordance therewith, said machine tool control system comprising:
  (a) manually controlled input means operable to produce blocks of manually selected machine tool control instructions as manually selected by an operator,
  (b) coded record means operable for supplying successive blocks of machine tool control instructions of a previously established sequence,
  (c) stored program digital computer means including computer memory means and computer output means, and said computer memory means being operable in a coded record preparation mode to store at respective locations thereof respective blocks of manually selected machine tool control instructions and to store at successive locations thereof successive blocks of machine tool control instructions of the previously established sequence, and said stored program digital computer means being operable in a machine tool operating mode to transmit to said computer output means selectively digital command signals in accordance with a block of manually selected machine tool control instructions from said manually controlled input means and digital command signals in accordance with a block of machine tool control instructions from the coded record means,
  (d) plural axis closed loop machine tool control means operatively connectable to the respective parts of the machine tool and responsive to said digital command signals to execute a block of machine tool control instructions by a single movement of the parts of the machine tool relative to the respective machine tool axes in accordance therewith, and
  (e) on-line computer bus means interconnecting said manually controlled input means, said coded record means and said stored program digital computer means and including multiconductor computer output bus cable means for transmitting on-line said digital command signals and extending from said computer output means of said stored program digital computer means to said closed loop machine tool control means for interconnecting said stored program digital computer means and said plural axis closed loop machine tool control means, thereby to form one complete unitized device.

12. A unitized machine tool control system operable both for generating a new sequence of machine tool control instructions for a machine tool and for controlling movement of parts of the machine tool relative to respective machine tool axes to verify a previously established sequence of machine tool control instructions, said unitized machine tool control system comprising:
  (a) manually controlled input means operable to produce manually selected blocks of machine tool control instructions as manually selected by an operator,
  (b) source means operable in an automatic mode for supplying successive blocks of machine tool control instructions of a previously established sequence, and operable in a step mode to supply a single block of machine tool control instruction of a previously established sequence with manual control of the supply of each successive block of machine tool control instructions,
  (c) stored program digital computer means operable to receive said manually selected blocks of machine tool control instructions and said successive blocks of machine tool control instructions, and including computer memory means providing for the separate storage herein and the separate retrieval therefrom of individual blocks of machine tool control instructions, said stored program digital computer means being operable in a first mode to transmit to said computer memory means for storage therein individual blocks of machine tool control instructions in accordance with manually selected blocks of machine tool control instructions and being operable in a second mode to transmit to said computer memory means for storage therein individual blocks of machine tool instructions in accordance with successive blocks of a previously established sequence, and being operable in a third mode to supply as an output therefrom digital command signals in accordance with a block of machine tool control instructions,
  (d) plural axis closed loop machine tool control means operatively connectable to the respective parts of the machine tool and responsive to said digital command signals to execute the corresponding block in a single movement of the parts of the machine tool relative to the respective machine tool axes in accordance therewith, and (e) on-line computer bus means interconnecting said manually controlled input means, said source means, said stored program digital computer means and said closed loop machine tool control means thereby to form one complete unitized device and providing for the on-line transmission of said manually selected blocks of machine tool control instructions from said manually controlled input means to said digital computer means, for the on-line transmission of successive blocks of machine tool control instructions from the source means to the digital computer means, and for the on-line transmission of said digital command signals from said digital computer means to said machine tool control means.

13. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce manually selected machine tool control instructions as manually selected by an operator, (b) source means for supplying successive blocks of machine tool control instructions of a previously established sequence, (c) stored program digital computer means operable to receive said manually selected machine tool control instructions and said successive blocks of machine tool control instructions, and including computer memory means providing for the storage therein and retrieval therefrom of machine tool control instructions, and computer output means, said stored program digital computer means being operable in a first mode to transmit to said computer memory means for storage therein blocks of machine tool control instructions in accordance with manually selected machine tool control instructions from said manually controlled input means, and being operable in a second mode to transmit to said computer output means digital command signals in accordance with each block of a previously established sequence of blocks of machine tool control instructions, (d) plural axis closed loop machine tool control means operatively connectable to the respective parts of the machine tool and responsive to said digital command signals to execute a block of machine tool control instructions by a single movement of the parts of the machine tool relative to the respective machine tool axes in accordance therewith, and (e) on-line computer bus connection means interconnecting said manually controlled input means, said source means and said stored program digital computer means for transmitting said blocks of machine tool control instructions, including multiconductor computer bus means for transmitting said digital command signals and extending from said computer output means of said stored program digital computer means to said closed loop machine tool control means, thereby to form one complete unitized device providing for on-line manual generation of machine tool control instructions, and on-line operation of the machine tool in accordance with a previously established sequence of blocks of machine tool control instructions.

14. A machine tool control system operable both for generating new machine tool control instructions for the machine tool and for controlling movement of parts of the machine tool relative to respective machine tool axes in accordance with a previously established sequence of machine tool control instructions, said machine tool control system comprising:

(a) manually controlled input means operable to produce coded input signals as manually selected by an operator, (b) source means for supplying successive machine tool control instructions of a previously established sequence, (c) stored program digital computer means operable to receive said coded input signals and said previously established sequence of machine tool control instructions and to receive digital error compensating signals, and providing for the storage therein and retrieval therefrom of machine tool control instructions and said digital error compensating signals, said stored program digital computer means being operable in a first mode to generate and store machine tool control instructions in accordance with coded input signals, being operable in a second mode to receive and store digital error compensating signals, in a third mode to transmit as an output therefrom digital command signals in accordance with successive machine tool control instructions of a previously established sequence and for modifying said digital command signals in accordance with said stored digital error compensating signals, (d) plural axis closed loop machine tool control means operatively connectable to the respective parts of the machine tool and responsive to said digital command signals to control movements of the parts of the machine tool relative to the respective machine tool axes in accordance therewith, and (e) on-line computer bus means interconnecting said manually controlled input means, said source means and said stored program digital computer means and including computer bus means extending from said stored program digital computer means to said closed loop machine tool control means for interconnecting said stored program digital computer means and said plural axis closed loop machine tool control means.

15. A unitized machine tool control system for a single machine tool and operable both for producing new coded records for the machine tool and for controlling movement of parts of the machine tool relative to respective machine tool axes, said unitized machine tool control system comprising:

(a) coded record means operable in an input mode for supplying successive machine tool control instructions of a previously established sequence and operable in an output mode for producing a sequence of machine tool control instructions on a coded record, (b) manually controlled input means operable to produce manually generated coded editing instructions as manually selected by an operator, (c) stored program digital computer means having random access computer memory means with individually accessible storage locations for storing respective machine tool control instructions, and operable in a first mode to store successive machine tool control instructions of a previously established sequence at respective individually accessible storage locations, operable in a second mode to modify the stored machine tool control instructions in accordance with manually generated coded editing instructions to produce a new sequence of stored machine tool control instructions in said computer memory means, operable in a third mode for supplying as an output a sequence of successive machine tool instructions as stored thereby, and operable in a fourth mode for generating digital command signals in accordance with machine tool control instructions of a previously established sequence, (d) plural axis closed loop machine tool control means operatively connectable to the respective parts of the machine tool and responsive to said digital command signals to control movements of the parts of the machine tool relative to the respective machine tool axes in accordance therewith, and (e) on-line computer bus means interconnecting said coded record means and said manually controlled input means with said stored program digital computer means for the on-line transmission of successive machine tool control instructions of a previously established sequence from the coded record means to said digital computer means, for the on-line transmission of a sequence of successive machine tool control instructions from the digital computer means to said coded record means for producing a coded record in accordance therewith, and for the on-line transmission of coded editing instructions from the input means to the digital computer means, and interconnecting said stored program digital computer means and said closed loop machine tool control means for the on-line transmission of digital command signals in accordance with machine tool control instructions of a previously established sequence from the digital computer means to said closed loop machine tool control means.

16. In a machine tool control system for generating digital command signals and for controlling movement of parts of a machine tool relative to respective machine tool axes in accordance therewith, (a) manually controlled input means operable to produce manually selected machine tool control instructions as manually selected by an operator, (b) coded record means operable for supplying successive machine tool control instructions of a previously established sequence, (c) stored program digital computer means including computer memory means, said computer memory means being operable in a coded record preparation mode to store manually selected machine tool control instructions, said stored program digital computer means being operable in a machine tool operating mode to transmit as an output therefrom digital command signals in accordance with manually selected machine tool control instructions from said manually controlled input means and in accordance with a sequence of machine tool control instructions from the coded record means, (d) plural axis closed loop machine tool control means operatively connectable to the respective parts of the machine tool and responsive to said digital command signals to control movements of the parts of the machine tool relative to the respective machine tool axes in accordance therewith, and (e) on-line computer bus means interconnecting said manually controlled input means, said coded record means and said stored program digital computer means, and extending from said stored program digital computer means to said closed loop machine tool control means for interconnecting said stored program digital computer means and said plural axis closed loop machine tool control means, thereby to form one complete unitized device providing for on-line manual generation of machine tool control instructions, and on-line operation of the machine tool selectively from said manually controlled input means and from said coded record means.

17. A unitized machine tool control system for a single machine tool, operable both for generating new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce coded input signals as manually selected by an operator, (b) source means for supplying successive blocks of machine tool control instructions of a previously established sequence, (c) stored program digital computer means operable to receive said coded input signals and said previously established sequence of blocks of machine tool control instructions, including computer memory means providing for the storage therein of a sequence of blocks of machine tool control instructions, and being operable to retrieve any of said sequence of blocks of machine tool control instructions in response to said coded input signals, said stored program digital computer means being operable in a first mode to transmit to said computer memory means for storage therein blocks of machine tool control instructions in accordance with coded input signals from said manually controlled input means, and being operable in a second mode to retrieve from said computer memory means and to supply as an output therefrom successive blocks of machine tool instructions of a previously stored sequence, and being operable in a third mode to supply as an output therefrom blocks of digital command signals in accordance with respective blocks of machine tool control instructions of a previously established sequence, (d) plural axis closed loop machine tool control means operatively connectable to the respective parts of the machine tool and responsive to a block of said digital command signals to effect corresponding movements of the parts of the machine tool relative to the respective machine tool axes without intervention of said digital computer means, and (e) on-line computer bus means interconnecting said manually controlled input means, said source means and said stored program digital computer means and including computer bus means extending from said stored program digital computer means to said closed loop machine tool control means for interconnecting said stored program digital computer means and said plural axis closed loop machine tool control means, thereby to form one complete unitized device and providing for the on-line transmission of coded input signals and successive blocks of machine tool control instructions to said digital computer means, and providing for the on-line transmission of a block of digital command signals from the digital computer means to said closed loop machine tool control means for the execution of the corresponding block of machine tool control instructions of said previously established sequence.

18. A unitized machine tool control system for a single machine tool, operable both for generating new machine tool control instructions for the machine tool and for controlling movement of parts of the machine tool relative to respective machine tool axes in accordance with a previously established sequence of machine tool control instructions so as to verify such previously established sequence at the machine tool, said unitized machine tool control system comprising:

(a) manually controlled input means operable to produce manually generated machine tool control instructions as manually selected by an operator, (b) source means for supplying successive blocks of machine tool control instructions of a previously established sequence, (c) stored program digital computer means operable to receive said manually generated machine tool control instructions and said previously established sequence of blocks of machine tool control instructions, and including computer memory means providing for the storage therein and retrieval therefrom of any of a sequence of blocks of machine tool control instructions, said stored program digital computer means being operable in a first mode to transmit to said computer memory means for storage therein blocks of machine tool control instructions in accordance with said manually generated machine tool control instructions from said manually controlled input means, being operable in a second mode to transmit to said computer memory means for storage therein blocks of machine tool instructions in accordance with a previously established sequence supplied from said source means, and being operable in a third mode to supply as output therefrom blocks of digital command signals in accordance with respective blocks of a previously established sequence of blocks of machine tool control instructions, (d) plural axis closed loop machine tool control means operatively connectable to the respective parts of the machine tool and responsive to a block of said digital command signals to effect corresponding movements of the parts of the machine tool relative to the respective machine tool axes without intervention of the digital computer means, and including absolute position counter means for maintaining a count in accordance with the absolute position of the respective parts of the machine tool relative to the respective machine tool axes during execution of successive blocks of said digital command signals and operable for providing a visual readout for verification of the corresponding sequence of blocks of machine tool control instructions as executed by the machine tool control means, (e) on-line computer bus means interconnecting said manually controlled input means, said source means, said stored program digital computer means and said closed loop machine tool control means, thereby to form one complete unitized device, providing for the on-line transmission of machine tool control instructions from said manually controlled input means and said source means to said digital computer means, and providing for the on-line transmission of a block of digital command signals from said digital computer means to said closed loop machine tool control means.

19. A unitized machine tool control system for a single machine tool and operable both for producing new coded records for the machine tool and for controlling movement of parts of the machine tool relative to respective machine tool axes, said unitized machine tool control system comprising:

(a) coded record means operable in an input mode for supplying successive blocks of machine tool control instructions of a previously established sequence and operable in an output mode for producing a sequence of blocks of machine tool control instructions on a coded record, (b) manually controlled input means operable to produce coded input signals as manually selected by an operator, (c) stored program digital computer means operable in a first mode to store successive blocks of machine tool control instructions of a previously established sequence, operable in a second mode to modify the stored blocks of machine tool control instructions in accordance with said coded input signals so as to produce a new sequence of stored blocks of machine tool control instructions, operable in a third mode for supplying as an output a sequence of successive blocks of machine tool instructions as stored thereby, and operable in a fourth mode for generating as an output blocks of digital command signals in accordance with respective blocks of machine tool control instructions of a previously established sequence, (d) plural axis closed loop machine tool control means operatively connectable to the respective parts of the machine tool and responsive to a block of said digital command signals to effect corresponding movements of the parts of the machine tool relative to the respective machine tool axes without intervention of said digital computer means, and (e) on-line connection means interconnecting said coded record means and said manually controlled input means with said stored program digital computer means for the on-line transmission of successive blocks of machine tool control instructions of a previously established sequence from the coded record means to said digital computer means, for the on-line transmission of a sequence of successive blocks of machine tool control instructions from the digital computer means to said coded record means for producing a coded record in accordance therewith, and for the on-line transmission of coded input signals from the input means to the digital computer means, and comprising multiconductor computer bus means extending from said stored program digital computer means to said closed loop machine tool control means for the on-line transmission of a block of digital command signals in accordance with a corresponding block of machine tool control instructions of a previously established sequence from the digital computer means to said closed loop machine tool control means.

20. A machine tool control system for generating digital command signals and for controlling movement of parts of a machine tool relative to respective machine tool axes in accordance therewith, said machine tool control system comprising:
  (a) manually controlled input means operable to produce manually selected machine tool control instructions as manually selected by an operator,
  (b) coded record means operable for supplying successive blocks of machine tool control instructions of a previously established sequence,
  (c) stored program digital computer means including computer memory means operable in a coded record preparation mode to store manually selected machine tool control instructions and said previously established sequence of blocks of machine tool control instructions, and said stored program digital computer means being operable in a machine tool operating mode to transmit as output therefrom blocks of digital command signals in accordance with manually selected machine tool control instructions from said manually controlled input means and in accordance with respective corresponding blocks of a sequence of blocks machine tool control instructions from the coded record means,
  (d.) plural axis closed loop machine tool control means operatively connectable to the respective parts of the machine tool and responsive to a block of said digital command signals to effect corresponding movements of the parts of the machine tool relative to the respective machine tool axes without intervention of the digital computer means, and
  (e) on-line computer bus means interconnecting said manually controlled input means, said coded record means and said stored program digital computer means and including multiconductor computer bus means for the on-line transmission of a block of said digital command signals and extending from said stored program digital computer means to said closed loop machine tool control means for interconnecting said stored program digital computer means and said plural axis closed loop machine tool control means.

21. A unitized machine tool control system for a single machine tool, operable both for generating a new sequence of machine tool control instructions for the machine tool and for controlling movement of parts of the machine tool relative to respective machine tool axes to verify a previously established sequence of machine tool control instructions, said unitized machine tool control system comprising:
  (a) manually controlled input means operable to produce manually selected machine tool control instructions as manually selected by an operator,
  (b) source means operable in an automatic mode for supplying successive blocks of machine tool control instructions of a previously established sequence, and operable in a step mode to supply a single block of machine tool control instruction of a previously established sequence with manual control of the supply of each successive block of machine tool control instructions,
  (c) stored program digital computer means operable to receive said manually selected machine tool control instructions and said previously established sequence of blocks of machine tool control instructions, and including computer memory means providing for the storage therein and retrieval therefrom of individual blocks of machine tool control instructions, said stored program digital computer means being operable in a first mode to transmit to said computer memory means for storage therein blocks of machine tool control instructions in accordance with said manually selected machine tool control instructions from said manually controlled input means, and being operable in a second mode to transmit to said computer memory means for storage therein blocks of machine tool instructions in accordance with a previously established sequence supplied from said source means, and being operable in a third mode to supply as an output therefrom blocks of digital command signals in accordance with respective blocks of a previously established sequence of blocks of machine tool control instructions,
  (d) plural axis closed loop machine tool control means operatively connectable to the respective parts of the machine tool and responsive to a block of said digital command signals to effect corresponding movements of the parts of the machine tool relative to the respective machine tool axes without intervention of said digital computer means, and
  (e) on-line computer bus means interconnecting said manually controlled input means, said source means, said stored program digital computer means and said closed loop machine tool control means thereby to form one complete unitized device and providing for the the on-line transmission of said manually selected machine tool control instructions from said manually controlled input means to said digital computer means, for the on-line transmission of successive blocks of machine tool control instructions from the source means to the digital computer means, and for the on-line transmission of a block of said digital command signals from said digital computer means to said machine tool control means.

22. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:
  (a) manually controlled input means operable to produce manually selected machine tool control instructions as manually selected by an operator,
  (b) source means for supplying successive blocks of machine tool control instructions of a previously established sequence, (c) stored program digital computer means operable to receive said manually selected machine tool control instructions and said previously established sequence of blocks of machine tool control instructions, and including computer memory means providing for the storage therein and retrieval therefrom of a sequence of blocks of machine tool control instructions, said stored program digital computer means being operable in a first mode to transmit to said computer memory means blocks of machine tool control instructions in accordance with manually selected machine tool control instructions from said manually controlled input means and being operable in a second mode to transmit therefrom as an output blocks of digital command signals in accordance with respective blocks of a previously established sequence of blocks of machine tool control instructions from said source means, (d) plural axis closed loop machine tool control means operatively connectable to the respective parts of the machine tool and responsive to a block of said digital command signals to effect corresponding movements of the parts of the machine tool relative to the respective machine tool axes without intervention of the digital computer means, and (e) on-line computer bus means interconnecting said manually controlled input means, said source means and said stored program digital computer means for the on-line transmission of said blocks of machine tool control instructions, including multi-conductor computer bus means for the on-line transmission of a block of said digital command signals and extending from said stored program digital computer means to said closed loop machine tool control means, thereby to form one complete unitized device providing for on-line manual generation of blocks of machine tool control instructions, and on-line operation of the machine tool in accordance with a previously established sequence of blocks of machine tool control instructions.

23. A computerized machine tool control system for unitized computer-assisted piece part programming and machine tool control, comprising:

(a) manually controlled input means operable to produce manually selected machine tool control instructions as manually selected by an operator, (b) source means for supplying successive blocks of machine tool control instructions of a previously established sequence, (c) stored program digital computer means operable to receive said manually selected machine tool control instructions and said previously established sequence of blocks of machine tool control instructions, and including computer memory means providing for the storage therein and retrieval therefrom of a sequence of blocks of said machine tool control instructions, said stored program digital computer means being operable in a first mode to transmit to said computer memory means for storage therein blocks of machine tool instructions in accordance with said manually selected machine tool control instructions supplied from said manually controlled input means and in accordance with a previously established sequence of blocks of machine tool control instructions supplied from said source means, and being operable in a second mode to supply as an output therefrom in accordance with a respective block of a previously established sequence of blocks of machine tool control instructions, a respective output block including displacement type command signals and auxiliary command signals for effecting respectively desired movements of the parts of the machine tool relative to the respective machine tool axes and the execution by the machine tool of an auxiliary machine tool function, (d) plural axis closed loop machine tool control means operatively connectable to the respective parts of the machine tool and responsive to an output block including said displacement type command signals to effect corresponding movements of the parts of the machine tool relative to the respective machine tool axes without intervention of said digital computer means, and including auxiliary machine tool function circuit means actuatable for causing the machine tool to execute an auxiliary machine tool function, (e) auxiliary function selector means connected with said auxiliary machine tool function circuit means and responsive to auxiliary command signals to actuate said auxiliary machine tool function circuit means, (f) manually operated switch means manually operable by the machine tool operator including auxiliary function switch means connected with said auxiliary machine tool function circuit means and manually actuatable to actuate said auxiliary machine tool function circuit means, and (g) on-line computer bus means interconnecting said manually controlled input means, said source means, said stored program digital computer means, said closed loop machine tool control means and said auxiliary function selector means thereby to form one complete unitized device and providing for the on-line transmission of said machine tool control instructions from said input means and said source means to said digital computer means, and for the on-line transmission of an output block including said displacement type command signals and said auxiliary command signals from said digital computer means to said machine tool control means and to said auxiliary function selector means, respectively.

24. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce manually selected machine tool control instructions as manually selected by an operator, (b) source means for supplying successive machine tool control instructions of a previously established sequence, (c) stored program digital computer means operable to receive said manually selected machine tool control instructions and said previously established sequence of machine tool control instructions, and including computer memory means providing for the storage therein and retrieval therefrom of machine tool control instructions and digital compensation values needed for compensation of machine tool control instructions, and computer output means, said stored program digital computer means being operable in a first mode to transmit to said computer memory means for storage therein machine tool control instructions in accordance with manually selected machine tool control instructions from said manually controlled input means, and being operable in a second mode to transmit to said computer output means digital displacement signals in accordance with a previously established sequence of machine tool control instructions from said source means and in accordance with the stored digital compensation values, (d) plural axis closed loop machine tool control means operatively connectable to the respective parts of the machine tool and responsive to digital displacement signals corresponding to one of said machine tool control instructions for the machine tool axes to effect corresponding complete movements of the parts of the machine tool relative to the respective machine tool axes in accordance therewith without intervention of the digital computer means, and (e) on-line computer bus connection means interconnecting said manually controlled input means, said source means and said stored program digital computer means for the on-line transmission of said machine tool control instructions, and interconnecting said stored program digital computer means and said closed loop machine tool control means for the on-line transmission of said digital displacement signals from said computer output means of said stored program digital computer means to said closed loop machine tool control means, thereby to form one complete unitized device providing for on-line manual generation of machine tool control instructions, and on-line operation of the machine tool in accordance with a previously established sequence of machine tool control instructions.

25. A machine tool control system for a single machine tool, operable for controlling movement of parts of the machine tool relative to respective machine tool axes in accordance with a previously established sequence of machine tool control instructions, said machine tool control system comprising:

(a) source means for supplying successive machine tool control instructions of a previously established sequence, (b) small-scale stored program digital computer means operable to receive said previously established sequence of machine tool control instructions, and including computer memory means providing for the storage therein and retrieval therefrom of digital compensation values needed for the compensation of machine tool control instructions, and computer output means, said stored program digital computer means being operable in a first mode to transmit to said computer memory means for storage therein said digital compensation values, and being operable in a second mode to transmit to said computer output means digital displacement signals in accordance with a previously established sequence of machine tool control instructions from said source means and in accordance with the stored digital compensation values, (c) plural axis closed loop machine tool control means operatively connectable to the respective parts of the machine tool and responsive to said digital displacement signals corresponding to one of said machine tool instructions for the machine tool axes to effect corresponding complete movements of the parts of the machine tool relative to the respective machine tool axes in accordance therewith without intervention of the digital computer means, and (d) on-line connection means interconnecting said source means, said small-scale stored program digital computer means and said closed loop machine tool control means, and including multiconductor computer bus cable means extending from said computer output means of said small-scale stored program digital computer means to said closed loop machine tool control means for the on-line transmission of said digital displacement signals from said digital computer means to said machine tool control means.

26. In a computerized numerical control system for a single machine tool, (a) closed loop machine tool control means including counter means for receiving digital displacement signals and for counting toward a null condition as a machine tool control instruction is executed, (b) small-scale stored program digital computer means for storing a digital correction signal representing the number of motion increments and the polarity of a correction needed to compensate said machine tool control instruction, and being operable to respond to a machine tool control instruction representing a desired movement along a machine tool axis of a given number of motion increments to algebraically combine said digital correction signal with said machine tool control instruction and to produce resultant digital displacement signals as output, and (C) on-line computer bus means providing an on-line connection between said small-scale stored program digital computer means and said closed loop machine tool control means for the on-line supply of the resultant digital displacement signals to said counter means so as to effect an execution of said machine tool control instruction which takes account of stored digital correction signal.

27. A numerical control system for a single machine tool, comprising:

(a) small-scale stored program digital computer means for receiving machine tool control instructions and a digital compensation value needed for compensation of said machine tool control instructions and operable to respond to a move-complete signal to generate digital displacement signals as output therefrom in accordance with a new machine tool control instruction and in accordance with said digital compensation value, (b) machine tool control means responsive to digital displacement signals and operable for counting toward a move-complete condition as the corresponding machine tool control instruction is executed and for supplying a move-complete signal when the move-complete condition has persisted for a predetermined substantial time interval, and (c) on-line computer bus means extending between said small-scale stored program digital computer means and said machine tool control means for the on-line transmission of said digital displacement signals from said small-scale stored program digital computer means to said machine tool control means and for the on-line transmission of said move-complete signal from said machine tool control means to said small-scale stored program digital computer means.

28. A unitized machine tool control system for a single machine tool and operable both for producing new coded records for the machine tool and for controlling movement of parts of the machine tool relative to respective machine tool axes, said unitized machine tool control system comprising:

(a) coded record means operable in an input mode for supplying successive machine tool control instructions of a previously established sequence and operable in an output mode for producing a sequence of machine tool control instructions on a coded record, (b) manually controlled input means operable to produce manually generated coded input signals as manually selected by an operator, (c) small-scale stored program digital computer means having random access computer memory means with individually accessible storage locations for storing respective machine tool control instructions, and operable in a first mode to store successive machine tool control instructins of a previously established sequence at respective individually accessible storage locations, operable in a second mode to modify the stored machine tool control instructions in accordance with manually generated coded input signals to produce a new sequence of stored machine tool control instructions in said computer memory means, operable in a third mode for supplying as an output a sequence of successive machine tool instructions as stored thereby, and operable in a fourth mode and conditioned on a move-complete status produced in said digital computer means for transmitting as an output therefrom digital displacement signals in accordance with a new machine tool control instruction of a previously established sequence, (d) plural axis machine tool control means operatively connectable to the respective parts of the machine tool and responsive to digital displacement signals corresponding to one of said machine tool control instructions to control movements of the parts of the machine tool relative to the respective machine tool axes in accordance therewith and operable to supply respective move-complete signals while the respective parts are substantially in respective new positions substantially in accordance with said one of said machine tool control instructions, and (e) on-line connection means interconnecting said coded record means and said manually controlled input means with said stored program digital computer means for the on-line transmission of successive machine tool control instructions of a previously established sequence from the coded record means to said digital computer means, for the on-line transmission of a sequence of successive machine tool control instructions from the digital computer means to said coded record means for producing a coded record in accordance therewith, and for the on-line transmission of coded input signals from the manually controlled input means to the digital computer means, and interconnecting said small-scale stored program digital computer means and said machine tool control means for the on-line transmission of digital displacement signals in accordance with one of said machine tool control instructions of a previously established sequence from the digital computer means to said machine tool control means, and for the on-line transmission of move-complete information from said machine tool control means to said digital computer means and for producing said move-complete status in said digital computer means in dependence upon the simultaneous existence for a preselected substantial time interval of the respective move-complete signals for said respective machine tool axes.

29. In a machine tool control system for controlling movement of parts of a machine tool relative to respective machine tool axes, (a) manually controlled input means operable to produce manually selected machine tool control instructions as manually selected by an operator, (b) coded record means operable for supplying successive machine tool control instructions of a previously established sequence, (c) stored program digital computer means including computer memory means, said computer memory means being operable in a coded record preparation mode to store manually selected machine tool control instructions, said stored program digital computer means being operable in a machine tool operating mode and conditional on an operation-complete status with respect to a previous machine tool operation to transmit as an output therefrom digital displacement signals in accordance with manually selected machine tool control instructions from said manually controlled input means and in accordance with a sequence of machine tool control instructions from the coded record means, (d) plural axis machine tool control means operatively connectable to the respective parts of the machine tool and responsive to said digital displacement signals corresponding to one of said machine tool control instructions to control movements of the parts of the machine tool relative to the respective machine tool axes in accordance therewith and operable to supply respective move-complete signals while the respective parts are substantially in respective new positions substantially in accordance with said one of said machine tool control instructions, and (e) on-line connection means interconnecting said manually controlled input means, said coded record means and said stored program digital computer means, and including computer bus means extending from said stored program digital computer means to said machine tool control means for interconnecting said stored program digital computer means and said plural axis machine tool control means, thereby to form one complete unitized device providing for on-line manual generation of machine tool control instructions, and on-line operation of the machine tool selectively from said manually controlled input means and from said coded record means, and including move-complete information transmission means for the on-line transmission of move-complete information from said machine tool control means to said digital computer means and for producing said operation-complete status in the digital computer means in dependence upon the simultaneous existence for a preselected substantial time interval of the respective move-complete signals for said respective machine tools axes.

30. A unitized machine tool control system consisting of a single machine tool, and operable both for generating new machine tool control instructions for the machine tool and for controlling movement of parts of the machine tool relative to respective machine tool axes in accordance with a previously established sequence of machine tool control instructions, said utilized machine tool control system further comprising:

(a) manually controlled input means operable to produce coded input signals as manually selected by an operator, (b) source means for supplying successive blocks of machine tool control instructions of a previously established sequence, (c) stored program digital computer means operable to receive said coded input signals and said previously established sequence of blocks of machine tool control instructions, including computer memory means providing for the storage therein of a sequence of blocks of machine tool control instructions, and being operable to retrieve any of said sequence of blocks of machine tool control instructions in response to said coded input signals, said stored program digital computer means being operable in a first mode to transmit to said computer memory means for storage therein blocks of machine tool control instructions in accordance with coded input signals from said manually controlled input means, and being operable in a second mode to retrieve from said computer memory means and to supply as an output therefrom successive blocks of machine tool instructions of a previously stored sequence, and being operable in a third mode and conditioned on an operation-complete status with respect to the execution of a previous machine tool instruction to supply as an output therefrom digital displacement signals in accordance with a further block of machine tool control instructions of a previously established sequence, (d) plural axis machine tool control means operatively connected to the respective parts of the machine tool and receiving feedback signals in accordance with the movement of aid parts and responsive to digital displacement signals corresponding to such further block of machine tool control instructions to effect corresponding movements of the parts of the machine tool relative to the respective machine tool axes and operable to supply respective move-complete signals while the respective parts are substantially in respective new positions substantially in accordance with such further machine tool control instruction, and (e) on-line connection means interconnecting said manually controlled input means, said source means and said stored program digital computer means and including computer bus means extending from said stored program digital computer means to said machine tool control means for interconnecting said stored program digital computer means and said machine tool control means, thereby to form one complete unitized device and providing for the on-line transmission of coded input signals and successive blocks of machine tool control instructins to said digital computer means, and providing for the on-line transmission of digital displacement signals from the digital computer means to said machine tool control means for the execution of the corresponding block of machine tool control instructions of said previously established sequence, and including move-complete information transmission means for the on-line transmission of move-complete information from said machine tool control means to said digital computer means and for producing said operation-complete status in the digital computer means in dependence upon the simultaneous existence for a preselected substantial time interval of the respective move-complete signals for said respective machine tool axes.

31. A machine tool control system operable both for generating new machine tool control instructions for machine tool and for controlling movement of parts of the machine tool relative to respective machine tool axes in accordance with a previously established sequence of machine tool control instructions so as to verify such previously established sequence at the machine tool, said machine tool control system comprising:

(a) manually controlled input means operable to produce manually generated machine tool control instructions as manually selected by an operator, (b) source means for supplying successive blocks of machine tool control instructions of a previously established sequence, (c) stored program digital computer means operable to receive said manually generated machine tool control instructions and said previously established sequence of blocks of machine tool control instructions, and including computer memory means providing for the storage therein and retrieval therefrom of any of a sequence of blocks of machine tool control instructions, said stored program digital computer means being operable in a first mode to transmit to said computer memory means for storage therein blocks of machine tool control instructions in accordance with said manually generated machine tool control instructions from said manually controlled input means, being operable in a second mode to transmit to said computer memory means for storage therein blocks of machine tool instructions in accordance with a previously established sequence supplied from said source means, and being operable in a third mode and in dependence upon a start condition therein to supply as output therefrom digital displacment signals in accordance with a further block of machine tool control instructions of a previously established sequence of blocks of machine tool control instructions, (d) plural axis machine tool control means operatively connectable to the respective parts of the machine tool and responsive to digital displacement signals in accordance with such further block of machine tool control instructions to effect corresponding movements of the parts of the machine tool relative to the respective machine tool axes and operable to supply respective move-complete signals while the respective parts are substantially in respective new positions substantially in accordance with such further block of machine tool control instructions, and including absolute position counter means for maintaining a count in accordance with the absolute position of the respective parts of the machine tool relative to the respective machine tool axes during execution of a previously established sequence of blocks of machine tool control instructions and operable for providing a visual readout for verification of each block of such previously established sequence of blocks of machine tool control instructions as executed by the machine tool control means, (e) on-line connection means interconnecting said manually controlled input means, said source means, said stored program digital computer means and said machine tool control means, thereby to form one complete unitized device, providing for the on-line transmission of machine tool control instructions from said manually controlled input means and said source means to said digital computer means, and providing for the on-line transmission of digital displacement signals from said digital computer means to said machine tool control means, and manual switch means disposed for manual actuation by the machine tool operator at the machine tool and operable in a step mode when the move-complete signals for the respective machine tool axes have existed simultaneously for a preselected substantial line interval to establish the start condition in the digital computer means.

32. A utilized machined tool control system consisting of a single machine tool, and operable both for producing new coded records for the machine tool and for controlling movement of parts of the machine tool relative to respective machine tool axes, said utilized machine tool control system further comprising:

(a) coded record means operable in an input mode for supplying successive blocks of machine tool control instructions of a previously established sequence and operable in an output mode for producing a sequence of blocks of machine tool control instructions on a coded record, (b) manually controlled input means operable to produce coded input signals as manually selected by an operator, (c) stored program digital computer means operable in a first mode to store successive blocks of machine tool control instructions of a previously established sequence, operable in a second mode to modify the stored blocks of machine tool control instructions in accordance with said coded input signals so as to produce a new sequence of stored blocks of machine tool control instructions, operable in a third mode for supplying as an output a sequence of successive blocks of machine tool instructions as stored thereby, and operable in a fourth mode and in dependence upon a manually generated start condition for generating as an output digital displacement signals in accordance with a further block of machine tool control instructions of a previously established sequence, (d) plural axis machine tool control means operatively connected to the respective parts of the machine tool and responsive to said digital displacement signals in accordance with such further block of machine tool control instructions to effect corresponding movements of the parts of the machine tool relative to the respective machine tool axes and including step mode switch means for placing said machine tool control means in a step mode of operation and requiring a manually controlled start actuation by a machine tool operator to establish the manually generated start condition of the digital computer means once the respective parts of the machine tool have remained substantially in respective new positions relative to the respective machine tool axes in accordance with a further block of machine tool control instructions simultaneously for a substantial time interval, and (e) on-line connection means interconnecting said coded record means and said manually controlled input means with said stored program digital computer means for the on-line transmission of successive blocks of machine tool contol instruction of a previously established sequence from the coded record means to said digital computer means, for the on-line transmission of a sequence of successive blocks of machine tool control instructions from the digital computter means to said coded record means for producing a coded record in accordance therewith, and for the on-line transmission of coded input signals from the input means to the digital computer means, and comprising computer bus means extending from said stored program digital computer means to said machine tool control means for the on-line transmission of digital displacement signals in accordance with a corresponding block of machine tool control instructions of a previously established sequence from the digital computer means to said machine tool control means.

33. A machine tool control system for control movement of parts of a machine tool relative to respective machine tool axes, said machine tool control system comprising:

(a) manually controlled input means operable to produce manually selected machine tool control instructions as manually selected by an operator, (b) coded record means operable for supplying successive blocks of machine tool control instructions of a previously established sequence, (c) stored program digital computer means including computer memory means operable in a coded record preparation mode to store manually selected machine tool control instructions and said previously established sequence of blocks of machine tool control instructions, and said stored program digital computer means being operable in a machine tool operating mode to transmit as output therefrom digital displacement signals in accordance with a block of manually selected machine tool control instructions from said manually controlled input means and in accordance with one of a sequence of blocks of machine tool control instructions from the coded record means, (d) plural axis machine tool control means operatively connectable to the respective parts of the machine tool and operable in response to digital displacement signals in accordance with a block of manually selected machine tool control instructions to execute such block and stop the parts substantially at the corresponding new positions relative to the respective machine tool axes, and operable in response to digital displacement signals in accordance with one block of said sequence of blocks of machine tool control instructions to execute such one block and stop the parts substantially at the respective corresponding new positions relative to the respective machine tool axes, and including step mode switch means for placing the machine tool control means in a step mode of operation such that a manually controlled start actuation by a machine tool operator is required once the parts have substantially stopped at respective new positions relative to respective machine tool axes, in order to enable the execution of a further block of machine tool control instructions, and (e) on-line connecting means interconnecting said manually controlled input means, said coded record means and said stored program digital computer means and including computer bus means for the on-line transmission of said digital displacement signals and extending from said stored program digital computer means to said machine tool control means for interconnecting said stored program digital computer means and said plural axis machine tool control means.

34. A unitized machine tool control system for a single machine tool, operable both for generating a new sequence of machine tool control instructions for the machine tool and for controlling movement of parts of the machine tool relative to respective machine tool axes to verify a previously established sequence of machine tool control instructions, said unitized machine tool control system comprising:

(a) manually controlled input means operable to produce manually selected machine tool control instructions as manually selected by an operator, (b) source means operable in an automatic mode for supplying successive blocks of machine tool control instructions of a previously established sequence without manual intervention by an operator and operable in a step mode to supply a single block of machine tool control instruction of a previously established sequence with manual control by a machine tool operator of the supply of each successive block of machine tool control instructions, (c) stored program digital computer means operable to receive said manually selected machine tool control instructions and said previously established sequence of blocks of machine tool control instructions, and including computer memory means providing for the storage therein and retrieval therefrom of individual blocks of a stored series of blocks of machine tool control instructions, said stored program digital computer means being operable in a first mode to transmit to said computer memory means for storage therein blocks of machine tool control instructions in accordance with said manually selected machine tool control instructions from said manually controlled input means, and being operable in a second mode to transmit to said computer memory means for storage therein blocks of machine tool instructions in accordance with a previously established sequence supplied from said source means, and being operable in a third mode to supply as an output therefrom digital displacement signals in accordance with a block of a previously established sequence of blocks of machine tool control instructions, (d) plural axis machine tool control means operatively connectable to the respective parts of the machine tool and responsive to said digital displacement signals in accordance with a block of machine, tool control instructions to effect corresponding movements of the parts of the machine tool relative to the respective machine tool axes and to substantially stop said parts at respective new positions in accordance with such block of machine tool control instructions, and (e) on-line connecting means interconnecting said manually controlled input means, sais source means, said stored program digital computer means and said machine tool control means thereby to form one complete unitized device and providing for the on-line transmission of said manually selected machine tool control instructions from said manually controlled input means to said digital computer means, for the on-line transmission of successive blocks of machine tool control instructions from the source means to the digital computer means, and including computer bus means extending from said digital computer means to said machine tool control means for the on-line transmission of digital displacement signals from said digital computer means to said machine tool control means.

35. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce manually selected machine tool control instructions as manually selected by an operator, (b) source means for supplying successive blocks of machine tool control instructions of a previously established sequence, (c) stored program digital computer means operable to receive said manually selected machine tool control instructions and said previously established sequence of blocks of machine tool control instructions, and including computer memory means providing for the storage therein and retrieval therefrom of a sequence of blocks of machine tool control instructions, said stored program digital computer means being operable in a first mode to transmit to said computer memory means for storage therein blocks of machine tool control instructions in accordance with manually selected machine tool control instructions from said manually controlled input means and being operable in a second mode and in an operation-complete status to transmit as an output therefrom digital displacement signals in accordance with a further block of a previously established sequence of blocks of machine tool control instructions from said source means, (d) plural axis machine tool control means operatively connectable to the respective parts of the machine tool and responsive to a stopped condition of the respective parts at substantially a previously commanded position to establish the operation-complete status of the digital computer means, and responsive to digital displacement signals in accordance with a further block of a previously established sequence of blocks of machine tool control instructions to effect corresponding movements of the parts of the machine tool relative to the respective machine tool axes and to place the parts substantially in the stopped condition at the commanded position, and (e) on-line connecting means interconnecting said manually controlled input means, said source means and said stored program digital computer means for the on-line transmission of said blocks of machine tool control instructions, including computer bus means for the on-line transmission of said digital displacement signals and extending from said stored program digital computer means to said machine tool control means, thereby to form one complete unitized device providing for on-line manual generation of blocks of machine tool control instructions, and on-line operation of the machine tool in accordance with a previously established sequence of blocks of machine tool control instructions.

36. A computerized machine tool control system for unitized computer-assisted piece part programming and machine tool control, comprising:

(a) manually controlled input means operable to produce manually selected machine tool control instructions as manually selected by an operator, (b) source means for supplying successive blocks of machine tool control instructions of a previously established sequence, (c) small-scale stored program digital computer means operable to receive said manually selected machine tool control instructions and said previously established sequence of blocks of machine tool control instructions, and including computer memory means providing for the storage therein and retrieval therefrom of a sequence of blocks of said machine tool control instructions, said stored program digital computer means being operable in a first mode to transmit to said computer memory means for storage therein blocks of machine tool instructions in accordance with said manually selected machine tool control instructions supplied from said manually controlled input means and in accordance with a previously established sequence of blocks of machine tool control instructions supplied from said source means, and being operable in a second mode to supply as an output therefrom displacement signals in accordance with a respective block of a previously established sequence of blocks of machine tool control instructions, and auxiliary command signals for effecting respectively desired movements of the parts of the machine tool relative to the respective machine tool axes and the execution by the machine tool of an auxiliary machine tool function, (d) plural axis machine tool control means operatively connectable to the respective parts of the machine tool and responsive to said displacement signals to effect corresponding movements of the parts of the machine tool relative to the respective machine tool axes and to substantially stop said parts at a new position in accordance with the corresponding block of machine tool control instructions and including auxiliary machine tool function circuit means actuatable for causing the machine tool to execute an auxiliary machine tool function, (e) auxiliary function selector means connected with said auxiliary machine tool function circuit means and responsive to auxiliary command signals to actuate said auxiliary machine tool function circuit means, (f) manually operated switch means manually operable by the machine tool operator and connected with said auxiliary machine tool function circuit means and manually actuatable to actuate said auxiliary machine tool function circuit means, and (g) on-line connecting means interconnecting said manually controlled input means, said source means, said stored program digital computer means, said machine tool control means and said auxiliary function selector means thereby to form one complete unitized device and providing for the on-line transmission of said machine tool control instructions from said input means and said source means to said digital computer means, and including computer bus means extending from said digital computer means to said machine tool control means and to said auxiliary machine tool function circuit means for the on-line transmission of said displacement signals and said auxiliary command signals from said digital computer means to said machine tool control means and to said auxiliary function selector means, respectively.

37. A unitized machine tool control system for a single machine tool, operable both for the manual generation of new machine tool control instructions for the machine tool and for controlling movement of parts of the machine tool relative to respective machine tool axes in accordance with a previously established sequence of machine tool control instructions, said unitized machine tool control system comprising:

(a) manually controlled input means operable to produce manually selected machine tool control instructions as manually selected by an operator, (b) source means for supplying successive machine tool control instructions of a previously established sequence, (c) small-scale stored program digital computer means operable to receive said manually selected machine tool control instructions and said previously established sequence of machine tool control instructions, and including computer memory means providing for the storage therein and retrieval therefrom of machine tool control instructions and digital compensation values needed for compensation of machine tool control instructions, said stored program digital computer means being operable in a first mode to transmit to said computer memory means for storage therein machine tool control instructions in accordance with manually selected machine tool control instructions from said manually controlled input means, and being operable in a second mode to transmit as an output therefrom digital displacement signals in accordance with a previously established sequence of machine tool control instructions from said source means and in accordance with the stored digital compensation values, (d) plural axis machine tool control means operatively connectable to the respective parts of the machine tool and responsive to digital displacement signals corresponding to one of said machine tool control instructions for the machine tool axes to effect corresponding complete movements of the parts of the machine tool relative to the respective machine tool axes in accordance therewith and to stop the parts substantially at a new position in accordance with said one of said machine tool control instructions, (e) on-line connection means interconnecting said manually controlled input means, said source means and said stored program digital computer means for the on-line transmission of said machine tool control instructions, and including computer bus means interconnecting said stored program digital computer means and said machine tool control means for the on-line transmission of said digital displacement signals from said stored program digital computer means to said machine tool control means, thereby to form one complete unitized device providing for on-line manual generation of ,machine tool control instructions, and on-line operation of the machine tool in accordance with a previously established sequence of machine tool control instructions.

38. A machine tool control system for a single machine tool, operable for controlling movement of parts of the machine tool relative to respective machine tool axes in accordance with a previously established sequence of machine tool control instructions, said machine tool control system comprising:

(a) source means for supplying successive machine tool control instructions of a previously established sequence, (b) small-scale stored program digital computer means operable to receive said previously established sequence of machine tool control instructions, and including computer memory means providing for the storage therein and retrieval therefrom of digital compensation values needed for the compensation of machine tool control instructions, said stored program digital computer means being operable in a first mode to transmit to said computer memory means for storage therein said digital compensation values, and being operable in a second mode to transmit as an output therefrom digital displacement signals in accordance with a previously established sequence of machine tool control instructions from said source means and in accordance with the stored digital compensation values, (c) plural axis machine tool control means operatively connectable to the respective parts of the machine tool and responsive to said digital displacement signals corresponding to one of said machine tool control instructions for the machine tool axes to effect corresponding complete movements of the parts of the machine tool relative to the respective machine tool axes in accordance therewith and to stop the parts substantially at a new position in accordance with said one of said machine tool control instructions, and (d) on-line connection means interconnecting said source means, said small-scale stored program digital computer means and said machine tool control means, and including computer bus means extending from said small-scale stored program digital computer means to said machine tool control means for the on-line transmission of said digital displacement signals from said digital computer means to said machine tool control means.

39. In a computerized numerical control system consisting of a single machine tool, (a) machine tool control means controlling said machine tool and including counter means for receiving digital displacement signals and for counting toward a null condition as a machine tool control instruction is executed, and for stopping the machine tool at a new position substantially corresponding to such machine tool control instruction, (b) stored program digital computer means for storing a digital correction signal representing the number of motion increments and the polarity of a correction needed to compensate said machine tool control instruction, and being operable to respond to a machine tool control instruction representing a desired movement along a machine tool axis of a given number of motion increments to algebraically combine said digital correction signal with said machine tool control instruction and to produce resultant digital displacement signals as output, and (c) on-line computer bus means providing an on-line connection between said stored program digital computer means and said machine tool control means for the on-line supply of the resultant digital displacement signals to said counter means so as to effect an execution of said machine tool control instruction which takes account of stored digital correction signal.

40. A numerical control system consisting of a single machine tool, and further comprising:

(a) stored program digital computer means for receiving machine tool control instructions and a digital compensation value needed for compensation of said machine tool control instructions and operable under the condition of an operation-complete status to generate digital displacement signals as output therefrom in accordance with a new machine tool control instruction and in accordance with said digital compensation value, (b) machine tool control means controlling said machine tool and responsive to digital displacement signals and operable for counting toward a move-complete condition as the corresponding machine tool control instruction is executed and for the transmission as an output therefrom of information dependent upon said move-complete condition, and (c) on-line computer bus means extending between said stored program digital computer means and said machine tool control means for the on-line transmission of said digital displacement signals from said stored program digital computer means to said machine tool control means and for the on-line transmision of informatin dependent upon said move-complete condition of said machine tool control means from said machine tool control means to said stored program digital computer means, thereby to establish the operation-complete status of said digital computer means.

41. In a computerized machine tool system consisting of a single machine tool having parts movable relative to respective machine tool axes, and feedback transducers movable in accordance with the movement of said parts and supplying respective feedback signals as a function of movement of the respective parts relative to the respective machine tool axes, (a) machine tool control means drivingly connected with the respective parts of the machine tool and connected with said feedback transducers for receiving said feedback signals, and responsive to digital displacement signals to control movements of the parts of the machine tool relative to the respective machine tool axes in accordance therewith, and operable based on the feedback signals from the feedback transducers to supply as an output therefrom coded data as to positioning errors of said machine tool during operation of said machine tool control means, (b) stored program digital computer means operable to supply digital displacement signals in accordance with each of a sequence of blocks of machine tool instructions, and operable to receive coded data as to positioning errors of said machine tool and to control the display of such coded data contemporaneously with its receipt, and (c) on-line interconnection means extending between said machine tool control means and said stored program digital computer means and interconnecting said machine tool control means and said digital computer means for the on-line transmission of said digital displacement signals from said computer means to said machine tool control means and for the on-line transmission of said coded data as to positioning errors from said machine tool control means to said digital computer means.

42. In a computerized machine tool system consisting of a single machine tool having parts movable relative to respective machine tool axes, and feedback transducers movable in accordance with the movement of said parts and supplying respective feedback signals as a function of movement of the respective parts relative to the respective machine tool axes, (a) machine tool control means drivingly connected with the respective parts of the machine tool and connected with said feedback transducers for receiving said feedback signals, and responsive to digital displacement signals to control movements of the parts of the machine tool relative to the respective machine tool axes in accordance therewith, said machine tool control means including respective counter means for responding to feedback signals from the feedback transducers which are generated as a function of movement of the respective parts of the machine tool and operable for supplying as output respective move-complete signals when the parts have substantially reached stopping positions relative to the respective machine tool axes, (b) stored program digital computer means operable to supply digital displacement signals in accordance with each of a sequence of desired movements of the parts of the machine tool to successive stopping positions, and operable to supply new displacement signals in dependence upon the simultaneous existence of move-complete signals for the respective parts for a substantial time interval sufficient to assure that the parts have essentially stopped at a preceding stopping position, and (c) on-line interconnection means interconnecting said machine tool control means and said digital computer means for the on-line transmission of said digital displacement signals from said digital computer means to said machine tool control means and for the on-line transmission of information in accordance with the existence of said move-complete signals from the machine tool control means to said digital computer means.

43. In a computerized machine tool system consisting of a single machine tool having parts movable relative to respective machine tool axes, and feedback transducers movable in accordance with the movement of said parts and supplying respective feedback signals as a function of movement of the respective parts relative to the respective machine tool axes, (a) machine tool control means drivingly connected with the respective parts of the machine tool and connected with said feedback transducers for receiving said feedback signals, and responsive to digital displacement signals to control movements of the parts of the machine tool relative to the respective machine tool axes in accordance therewith, and operable to supply move-complete signals when the parts have completed a positioning operation and substantially stopped at a new position, (b) stored program digital computer means operable to store error correction signals for substantially compensating for errors in the positioning of the parts of the machine tool as represented by said feedback transducers and automatically operable for correcting each of a sequence of positioning operations of the parts of the machine tool in accordance with such stored error correction signals, and responsive to an operation-complete status condition with respect to a preceding positioning operation to supply as output therefrom digital displacement signals for correcting a new positioning operation in accordance with currently stored error correction signals therein, and (c) on-line interconnection means interconnecting said machine tool control means and said digital computer means for the on-line transmission of information responsive to the existence of said move-complete signals to said digital computer means to provide for the operation-complete status condition of said digital computer means at the completion of each positioning operation, and for the on-line transmission of said digital displacement signals from said digital computer means to said machine tool control means.

44. In a computerized machine tool system consisting of a single machine tool having parts movable relative to respective machine tool axes, and feedback transducers movable in accordance with the movement of said parts and supplying respective feedback signals as a function of movement of the respective parts relative to the respective machine tool axes, (a) machine tool control means drivingly connected with the respective parts of the machine tool and connected with said feedback transducers for receiving said feedback signals, and responsive to digital displacement signals to control movements of the parts of the machine tool relative to the respective machine tool axes in accordance therewith, said machine tool control means including respective digital to analog converter means for the respective machine tool axes for receiving the respective feedback signals and for receiving displacement signals in accordance with a positioning operation to be effected by said machine tool control means and for supplying respective move-complete signals in dependence upon respective move-complete conditions of the respective converter means, (b) stored program digital computer means operable to supply digital displacement signals to initiate each of a sequence of positioning operations of the machine tool and responsive to an operation-complete status to initiate a new positioning operation, and (c) on-line interconnection means interconnecting said machine tool control means and said digital computer means for the on-line transmission of move-complete information in dependence upon the existence of said move-complete signals from said digital to analog converter means to said digital computer means for the establishment of said operation-complete status of said digital computer means at the completion of a positioning operation of said machine tool control means, and including computer bus means extending between said digital computer means and said machine tool control means for the on-line transmission of said digital displacement signals from said digital computer means to said machine tool control means to effect a new positioning operation of said machine tool control means.

45. In a machine tool system consisting of a single machine tool having parts movable relative to respective machine tool axes over respective maximum ranges of movement and having feedback transducer means movable in accordance with the movement of the respective parts for generating feedback signals, (a) stored program digital computer means having console means for on-line real time communication with said digital computer means in preparing coded records for subsequent use in controlling said machine tool, and having automatically operating coded record input means for supplying numerical positioning command data thereto, and said digital computer means being operable to supply compensated command data as an output therefrom in accordance with the numerical positioning command data from the coded record input means and compensated to correct for current machine tool positioning errors, and (b) machine tool closed loop servo means connected with the parts of the machine tool for positioning the parts relative to the respective machine tool axes in accordance with digital signals and comprising digital counting means for generating analog error signals for controlling the rate of movement of the parts relative to the respective machine tool axes and coupled with said feedback transducer means for responding to said feedback signals representing movement of the parts to control said analog error signals, (c) machine tool positioning interface means operable to receive compensated command data corresponding to the maximum ranges of movement of the parts of the machine tool and connected to said machine tool closed loop servo means for the supply of digital signals thereto in accordance with said compensated command data to cause the servo means to effect successive positioning operations of the parts of the machine tool in accordance with the compensated command data, and (d) on-line computer bus cable means extending between said digital computer means and said machine tool positioning interface means for the on-line transmission of the compensated command data from said digital computer means to said interface means.

46. In a machine tool system having only a single machine tool and including respective feedback transducer means for supplying respective feedback signals in accordance with movement of parts of the machine tool relative to respective machine tool axes, (a) manually controlled input means operable to produce coded input signals as manually selected by an operator, (b) stored program digital computer means operable to receive a previously established sequence of machine tool control instructions, including computer memory means providing for the storage therein and retrieval therefrom of a sequence of machine tool control instructions, and being operable in a first mode to receive said coded input signals and to transmit to said computer memory means for storage therein machine tool control instructions in accordance with coded input signals from said manually controlled input means, and being operable in a second mode to supply from said computer memory means a sequence of machine tool instructions in accordance with a previously stored sequence, and being operable in a third mode to transmit as an output therefrom digital command signals in accordance with a previously established sequence of machine tool control instructions, (c) plural axis closed loop machine tool control means operatively coupled to the respective parts of the machine tool and to said feedback transducer means and responsive to said digital command signals and to said feedback signals to control movements of the parts of the machine tool relative to the respective machine tool axes, and (d) on-line connection means interconnecting said manually controlled input means, said stored program digital computer means and said closed loop machine tool control means thereby to form one complete unitized device providing for on-line manual generation of machine tool control instructions and on-line operation of the machine tool in accordance with a previously established sequence of machine tool control instructions.

47. In a machine tool system having only a single machine tool and including respective feedback transducer means responsive to movement of parts of a machine tool relative to respective machine tool axes to generate feedback signals in accordance therewith, (a) manually controlled input means operable to produce manually selected machine tool control instructions as manually selected by an operator, (b) coded record means operable for supplying successive machine tool control instructions of a previously established sequence, (c) stored program digital computer means including computer memory means operable in a coded record preparation mode to store manually selected machine tool control instructions and said previously established sequence of machine tool control instructions, being operable in a machine tool operating mode to transmit as an output therefrom digital command signals in accordance with a sequence of machine tool control instructions, (d) plural axis closed loop machine tool control means operatively coupled to the respective parts of the machine tool and to said feedback transducer means and responsive to said digital command signals and to said feedback signals to control movements of the parts of the machine tool relative to the respective machine tool axes, and (e) on-line connection means interconnecting said manually controlled input means, said coded record means, said stored program digital computer means and said plural axis closed loop machine tool control means, thereby to form one complete unitized device providing for on-line manual generation of machine tool control instructions and on-line operation of the machine tool.

48. In a machine tool system having only a single machine tool, and including feedback transducer means coupled for movement with parts of the machine tool relative to respective machine tool axes to supply feedback signals in accordance with such movement,
 (a) manually controlled input means operable to produce manually selected machine tool control instructions as manually selected by an operator,
 (b) stored program digital computer means operable to receive said manually selected machine tool control instructions and to receive a previously established sequence of machine tool control instructions, and including computer memory means providing for the storage therein and retrieval therefrom of machine tool control instructions, said stored program digital computer means being operable in a first mode to transmit to said computer memory means for storage therein machine tool control instructions in accordance with manually selected machine tool control instructions from said manually controlled input means, and being operable in a second mode to transmit as an output therefrom digital command signals in accordance with a previously established sequence of machine tool control instructions,
 (c) plural axis closed loop machine tool control means operatively coupled to the respective parts of the machine tool and to said feedback transducer means and responsive to said digital command signals and to said feedback signals to control movements of the parts of the machine tool relative to the respective machine tool axes, and
 (d) on-line connection means interconnecting said manually controlled input means, said stored program digital computer means and said closed loop machine tool control means, thereby to form one complete unitized device providing for on-line manual generation of machine tool control instructions, and on-line operation of the machine tool in accordance with a previously established sequence of machine tool control instructions.

49. In a machine tool system having only a single machine tool, and providing unitized computer-assisted piece part programming and machine tool control,
 (a) manually controlled input means operable to produce coded input signals as manually selected by an operator,
 (b) stored program digital computer means operable to receive said coded input signals and including computer memory means providing for the storage therein of blocks of machine tool control instructions and retrieval therefrom of individual blocks of machine tool control instructions of a stored sequence of such blocks, and computer output means for transmitting digital command words having a predetermined number of bit positions, and said stored program digital computer means being operable in a first mode to transmit to said computer memory means blocks of machine tool control instructions in accordance with coded input signals from said manually controlled input means and being operable in a second mode to supply as output from said computer memory means blocks of machine tool instructions in accordance with a stored sequence of such blocks, and being operable in a third mode to transmit to said computer output means digital command words together corresponding to a block of machine tool control instructions of a previously established sequence,
 (c) plural axis closed loop machine tool control means operatively coupled in driving relation to the respective parts of the machine tool and including feedback transducer means driven in accordance with the movement of such parts, for controlling positioning operations of the machine tool relative to the respective machine tool axes, and including machine tool positioning interface means having respective sections of gates for transmitting the respective digital command words together corresponding to a block of machine tool control instructions, respective axis register means each having respective register sections connected with respective sections of said gates, and gate selector means for controlling said sections of gates and operable to activate the sections of gates to load each digital command word into a respective register section in parallel, but to load the respective register sections of a respective axis register means in sequence, and said machine tool control means being responsive to said digital command words corresponding to a block of machine tool control instructions to control movements of the parts of the machine tool relative to the respective machine tool axes in accordance therewith, and
 (d) on-line connection means interconnecting said manually controlled input means, and said stored program digital computer means, and interconnecting said computer output means of said stored program digital computer means, and said sections of gates of said machine tool positioning interface means of said plural axis closed loop machine tool control means, thereby to form one complete unitized device providing for on-line manual generation of blocks of machine tool control instructions, and on-line operation of the machine tool in accordance with a previously established sequence of blocks of machine tool control instructions.

50. In a machine tool system having only one machine tool and operable both for generating new machine tool control instructions for the machine tool and for controlling movement of parts of the machine tool relative to respective machine tool axes in accordance with a previously established sequence of machine tool control instructions so as to verify such previously established sequence on said machine tool,
 (a) manually controlled input means operable to produce manually generated incremental machine tool control instructions as manually selected by an operator,
 (b) stored program digital computer means operable to receive said manually generated incremental machine tool control instructions and to receive blocks of incremental machine tool control instructions of a previously established sequence, and including computer memory means providing for the storage therein of successive blocks of machine tool control instructions and retrieval therefrom of any individual block of machine tool control instructions of a stored sequence of such blocks, said stored program digital computer means being operable in a first mode to transmit to said computer memory means for storage individual blocks of machine tool control instructions in accordance with said manually generated incremental machine tool control instructions from said manually controlled input means, being operable in a second mode to supply as output from said computer memory means successive individual blocks of incremental machine tool instructions in accordance with a stored sequence of such blocks, and being operable in a third mode to supply output digital command words in accordance with each block of a previously established sequence of blocks of incremental machine tool control instructions, (c) plural axis closed loop machine tool control means operatively coupled to the respective parts of the machine tool and each being responsive to a plurality of said digital command words assembled into an incremental axis command therein to control an incremental movement of a respective corresponding part of the machine tool relative to the respective machine tool axis, and including respective absolute position counter means for maintaining respective counts in accordance with the absolute position of the respective parts of the machine tool relative to the respective machine tool axes during execution of each successive block of the previously established sequence of blocks of incremental machine tool control instructions, and operable for providing a visual readout for verification of the sequence of blocks of incremental machine tool control instructions as executed by the machine tool control means, and (d) on-line connection means interconnecting said manually controlled input means, said source means, said stored program digital computer means and said closed loop machine tool control means, thereby to form one complete unitized device.

51. In a machine tool system having only a single machine including parts movable relative to respective machine tool axes and including feedback transducer means for supplying respective feedback signals in accordance with movement of the respective parts of the machine tool relative to respective machine tool axes.

(a) coded record means operable in an input mode for supplying successive blocks of machine tool control instructions of a previously established sequence and operable in an output mode for producing a sequence of blocks of machine tool control instructions on a coded record, (b) manually controlled input means operable to produce manually generated coded input signals as manually selected by an operator, (c) stored program digital computer means including random access computer memory means for storing at respective locations respective blocks of machine tool control instructions, and operable in a first mode to store successive blocks of machine tool control instructions of a previously established sequence at successive locations of said computer memory means, and operable in a second mode to respond to respective manually generated coded input signals as identifying respective ones of said locations of said computer memory means and to produce a new sequence of blocks of machine tool control instructions based on the previously established sequence stored in said computer memory means, operable in a third mode for supplying as an output a sequence of blocks of machine tool instructions as stored in said computer memory means, and operable in a fourth mode for generating digital command signals in accordance with successive blocks of machine tool control instructions of a previously established sequence, (d) plural axis closed loop machine tool control means operatively coupled in driving relation to the respective parts of the machine tool and connected with said feedback transducer means and responsive to said digital command signal and said feedback signals to execute a block of the machine tool control instructions in one move of the parts relative to the respective machine tool axes in accordance therewith, and (e) on-line interconnection means interconnecting said coded record means, said manually controlled input means, said stored program digital computer means for the on-line transmission of successive blocks of machine tool control instructions of a previously established sequence from the coded record means to said digital computer means, for transmitting on-line a sequence of successive blocks of machine tool control instructions from the digital computer means to said coded record means for producing a coded record in accordance therewith, and for the on-line transmission of coded input signals from the manually controlled input means to the digital computer means, and interconnecting said stored program digital computer means and said closed loop machine tool control meas for the on-line supply of digital command signals in accordance with a block of machine tool control instructions of a previously established sequence from the digital computer means to said closed loop machine tool control means.

52. In a machine tool system having only a single machine tool including parts movable relative to respective machine tool axes, and feedback transducer means for supplying feedback signals in accordance with the movement of the respective parts, (a) manually controlled input means operable to produce manually selected machine tool control instructions as manually selected by an operator, (b) coded record means operable for supplying successive blocks of machine tool control instructions of a previously established sequence, (c) stored program digital computer means including computer memory means operable in a coded record preparation mode to store at respective locations thereof respective blocks of machine tool control instructions in accordance with said manually selected machine tool control instructions and to store at successive locations thereof successive blocks of machine tool control instructions of the previously established sequence, and said stored program digital computer means being operable in a machine tool operating mode to transmit as an output therefrom selectively digital command signals in accordance with manually selected machine tool control instructions from said manually controlled input means and digital command signals in accordance with a block of machine tool control instructions of a previously established sequence, (d) plural axis closed loop machine tool control means operatively coupled in driving relation to the respective parts of the machine tool and to the feedback transducer means and responsive to said digital command signals and to said feedback signals to execute a block of machine tool control instructions by a single movement of the parts of the machine tool relative to the respective machine tool axes in accordance therewith, and (e) on-line interconnection means interconnecting said manually controlled input means, said coded record means, said stored program digital computer means and said closed loop machine tool control means, thereby to form one complete unitized device.

53. In a machine tool system having only a single machine tool with parts of the machine tool movable relative to respective machine tool axes and feedback transducer means for supplying feedback signals in accordance with the movement of such parts, (a) manually controlled input means operable to produce manually selected blocks of machine tool control instructions as manually selected by an operator, (b) stored program digital computer means operable to receive said manually selected blocks of machine tool control instructions and to receive a previously established sequence of blocks of machine tool control instructions, and including computer memory means providing for the separate storage therein and the separate retrieval therefrom of individual blocks of machine tool control instructions, said stored program digital computer means being operable in a first mode to transmit to said computer memory means for storage therein individual blocks of machine tool control instructions in accordance with manually selected blocks of machine tool control instructions and being operable in a second mode to supply as output from said computer memory means individual blocks of machine tool instructions of a stored sequence of such blocks and being operable in a third mode to supply as an output therefrom digital command signals in accordance with a block of machine tool control instructions, (d) plural axis closed loop machine tool control means operatively coupled in driving relation to the respective parts of the machine tool and to said feedback transducer means and responsive to said digital command signals to execute the corresponding block in a single movement of the parts of the machine tool relative to the respective machine tool axes in accordance therewith, and (e) on-line interconnecting means interconnecting said manually controlled input means, said source means, said stored program digital computer means and said closed loop machine tool control means thereby to from one complete unitized device and providing for the on-line transmission of said manually selected blocks of machine tool control instructions from said manually controlled input means to said digital computer means and for the on-line transmission of said digital command signals from said digital computer means to said machine tool control means.

54. In a machine tool system having only a single machine tool with parts of the machine tool being movable relative to respective machine tool axes and feedback transducer means operable for supplying feedback signals in accordance with the movement of such parts, (a) manually controlled input means operable to produce manually selected machine tool control instructions as manually selected by an operator, (b) stored program digital computer means operable to receive said manually selected machine tool control instructions and to receive a previously established sequence of blocks of machine tool control instructions, and including computer memory means providing for the storage therein and retrieval therefrom of machine tool control instructions, said stored program digital computer means being operable in a first mode to transmit to said computer memory means for storage therein blocks of machine tool control instructions in accordance with manually selected machine tool control instructions from said manually controlled input means, and being operable in a second mode to transmit as an output therefrom digital command signals in accordance with each block of a previously established sequence of blocks of machine tool control instructions, (c) plural axis closed loop machine tool control means operatively coupled in driving relation to the respective parts of the machine tool and to said feedback transducer means and responsive to said digital command signals and to said feedback signals to execute a block of machine tool control instructions by a single movement of the parts of the machine tool relative to the respective machine tool axes in accordance therewith, and (d) on-line means interconnecting said manually controlled input means, said stored program digital computer and said closed loop machine tool control means, thereby to form one complete unitized device providing for on-line manual generation of machine tool control instructions, and on-line operation of the machine tool in accordance with a previously established sequence of blocks of machine tool control instructions.

55. In a machine tool system having only a single machine tool including parts movable relative to respective machine tool axes, and feedback transducer means for supplying feedback signals in accordance with movement of said parts, (a) manually controlled input means operable to produce coded input signals as manually selected by an operator, (b) stored program digital computer means operable to receive said coded input signals and to receive a previously established sequence of machine tool control instructions and to receive digital error compensation signals, and providing for the storage therein and retrieval therefrom of machine tool control instructions and said digital error compensating signals, said stored program digital computer means being operable in a first mode to store machine tool control instructions in accordance with coded input signals, being operable in a second mode to receive and store digital error compensating signals, in a third mode to transmit as an output therefrom digital command signals in accordance with successive machine tool control instructions of a previously established sequence and for modifying said digital command signals in accordance with said stored digital error compensating signals, (c) plural axis closed loop machine tool control means operatively coupled to the respective parts of the machine tool and to said feedback transducer means and responsive to said digital command signals and said feedback signals to control movements of the parts of the machine tool relative to the respective machine tool axes, and (d) on-line means interconnecting said manually controlled input means, said source means, said stored program digital computer means and said closed loop machine tool control means.

56. In a computerized machine tool system having only a single machine tool, said machine tool being operable for executing an auxiliary machine tool function and including respective parts movable relative to respective machine tool axes in executing a machine tool positioning operation, and feedback transducer means for supplying respective feedback signals, (a) manually controlled input means operable to produce manually selected machine tool control instructions as manually selected by an operator, (b) stored program digital computer means operable to receive said manually selected machine tool control instructions and to receive a previously established sequence of blocks of machine tool control instructions, and including computer memory means providing for the storage therein and retrieval therefrom of a sequence of blocks of said machine tool control instructions, said stored program digital computer means being operable in a first mode to transmit to said computer memory means for storage therein blocks of machine tool instructions in accordance with said manually selected machine tool control instructions supplied from said manually controlled input means to produce a stored sequence of blocks of machine tool control instructions in said computer memory means, and being operable in a second mode to supply as an output therefrom in accordance with a respective block of a previously established sequence of blocks of machine tool control instructions, a respective output block including displacement signals and auxiliary command signals for effecting respectively desired movements of the parts of the machine tool relative to the respective machine tool axes and the execution by the machine tool of an auxiliary machine tool function, (c) plural axis closed loop machine tool control means operatively coupled to the respective parts of the machine tool and to said feedback transducer means and responsive to an output block including said displacement signals and said feedback signals to effect corresponding movements of the parts of the machine tool relative to the respective machine tool axes without intervention of said digital computer means and without supply of feedback signals to said digital computer means, and including auxiliary machine tool function circuit means connected with the machine tool and actuatable for causing the machine tool to execute said auxiliary machine tool function, (d) auxiliary function selector means connected with said auxiliary machine tool function circuit means and responsive to auxiliary command signals to actuate said auxiliary machine tool function circuit means, (e) manually operated switch means manually operable by the machine tool operator and connected with said auxiliary machine tool function circuit means and manually actuatable to actuate said auxiliary machine tool function circuit means, and (f) on-line means interconnecting said manually controlled input means, said stored program digital computer means, said closed loop machine tool control means and said auxiliary function selector means thereby to form one complete unitized device and providing for the on-line transmission of said machine tool control instructions from said manually controlled input means to said digital computer means, and for the on-line transmission of an output block including said displacement signals and said auxiliary command signals from said digital computer means to said machine tool control means and to said auxiliary function selector means, respectively.

57. In a machine tool system having only a single machine with parts of the machine tool being movable relative to respective machine tool axes in effecting positioning operations of the machine tool, and feedback transducer means for supplying feedback signal in accordance with movement thereof, (a) stored program digital computer means operable to receive a previously established sequence of machine tool control instructions, and including computer memory means providing for the storage therein and retrieval therefrom of digital compensation values needed for the compensation of machine tool control instructions, said stored program digital computer means being operable in a first mode to transmit to said computer memory means for storage therein said digital compensation values, and being operable in a second mode to transmit as an output therefrom digital displacement signals in accordance with a previously established sequence of machine tool control instructions from said source means and in accordance with the stored digital compensation values, (b) plural axis closed loop machine tool control means operatively coupled in driving relation to the respective parts of the machine tool and to the feedback transducer means and responsive to said digital displacement signals corresponding to one of said machine tool instructions for the machine tool axes and to said feedback signals as a function of movement of the parts of the machine tool to effect corresponding complete movements of the parts of the machine tool relative to the respective machine tool axes in accordance therewith without intervention of the digital computer means and without supply of said feedback signals to said digital computer means, and (c) on-line means interconnecting said source means, said stored program digital computer means and said closed loop machine tool control means.

58. In a computerized machine tool system having only a single machine tool, and feedback transducer means responsive to positioning operations of the machine tool, (a) closed loop machine tool control means including counter means for receiving digital displacement signals and for counting toward a null condition as a machine tool control instruction is executed, and digital to analog converter means controlled by said counter means and controlling the driving of said feedback transducer means and for controlling positioning operations of the machine tool as reflected by the feedback from said transducer means, (b) stored program digital computer means for storing a digital correction signal representing the number of motion increments and the polarity of a correction needed to compensate a machine tool control instruction, and being operable to respond to a machine tool control instruction representing a desired movement along a machine tool axis of a given number of motion increments to algebraically combine said digital correction signal with said machine tool control instruction and to produce resultant digital displacement signals as output, and (c) on-line means providing an on-line connection between said stored program digital computer means and said closed loop machine tool control means for the on-line supply of the resultant digital displacement signals to said counter means so as to effect an execution of said machine tool control instruction which takes account of stored digital correction signal, and without any supply of feedback from feedback transducer means to said digital computer means.

59. A computerized machine tool control system comprising a motion counter circuit for responding to feedback pulses generated as a function of movement of a part of a machine tool, a stored program digital minicomputer connected with said counter circuit and operable in conjunction with said counter circuit for controlling movement of the machine tool, and two-way information transmission circuitry connecting said counter circuit on line with said stored program digital minicomputer for the two-way interchange of information between said counter circuit and said stored program digital minicomputer during control of the movement of the machine tool.

60. A computerized machine tool control system comprising:

a machine tool including a part movable relative to a machine axis, a feedback transducer system for producing feedback pulses as a function of movement of the part relative to said machine axis, and an axis drive circuit mechanically coupled with said part of said machine tool and with said feedback transducer system for effecting movement thereof, machine control circuitry connected with and controlling said axis drive circuit and including a counter circuit connected with said feedback transducer system for receiving and responding to said feedback pulses, and for maintaining a count value which is a function of the position of said part during a control cycle, a stored program digital computer connected on line with said counter circuit for reading the count value in said counter circuit during a readout operation, and synchronizing circuitry connected between said feedback transducer system and said counter circuit and including a hold circuit connected with said computer and selectively operable thereby, said synchronizing circuitry being responsive to operation of said hold circuit by said computer to interrupt the supply of feedback pulses from said feedback system to said counter circuit for a hold time interval related to the duration of said readout operation such that transitions of the count value in the counter circuit are prevented during said readout operation.

61. A computerized machine tool control system comprising machine tool control means operable under the control of respective machine tool displacement commands to effect respective machine tool movements relative to a plurality of machine tool axes and comprising pulse counter means for each respective machine tool axis for registering a machine tool axis displacement command representing a number of increments of movement to be effected with respect to the machine tool axis and operable for signalling an axis move complete condition when a number of pulses corresponding to the number of increments represented by the registered axis displacement command has been counted, stored program digital computer circuit means connectable on line with said machine tool control means for conditioning the control means for the execution of each new machine tool movement relative to the machine tool axes, and being operable in conjunction with the pulse counter means for the respective machine tool axes for determining when each successive machine tool movement of a sequence of movements has been completed, and two-way information transmission means interconnecting said stored program digital computer circuit means and said machine tool control means for on-line coupling of the digital computer circuit means with the machine tool control means to provide for the conditioning of the control means for the execution of each successive machine tool movement of a sequence of movements under the control of said pulse counter means and in accordance with a respective corresponding machine tool displacement command registered in said pulse counter means, and for on-line coupling of the pulse counter means with the digital computer circuit means to provide for the sensing by the digital computer circuit means of the completion of each successive machine tool movement of the sequence as signalled by the axis move complete condition of each of the pulse counter means.

* * * * *